(12) United States Patent
Iriyama et al.

(10) Patent No.: US 10,878,546 B2
(45) Date of Patent: Dec. 29, 2020

(54) IMAGE PROCESSING DEVICE, IMAGE PROCESSING METHOD, AND IMAGING DEVICE

(71) Applicant: SONY SEMICONDUCTOR SOLUTIONS CORPORATION, Kanagawa (JP)

(72) Inventors: Shingo Iriyama, Kanagawa (JP); Yoshikuni Nomura, Tokyo (JP)

(73) Assignee: SONY SEMICONDUCTOR SOLUTIONS CORPORATION, Kanagawa (JP)

(*) Notice: Subject to any disclaimer, the term of this patent is extended or adjusted under 35 U.S.C. 154(b) by 0 days.

(21) Appl. No.: 16/321,254

(22) PCT Filed: Aug. 2, 2017

(86) PCT No.: PCT/JP2017/028104
§ 371 (c)(1),
(2) Date: Jan. 28, 2019

(87) PCT Pub. No.: WO2018/034157
PCT Pub. Date: Feb. 22, 2018

(65) Prior Publication Data
US 2019/0180428 A1   Jun. 13, 2019

(30) Foreign Application Priority Data
Aug. 16, 2016   (JP) .................................. 2016-159546

(51) Int. Cl.
*G06T 5/50* (2006.01)
*H04N 5/232* (2006.01)
(Continued)

(52) U.S. Cl.
CPC ................ *G06T 5/50* (2013.01); *G06T 5/003* (2013.01); *G06T 7/0002* (2013.01); *G06T 7/90* (2017.01);
(Continued)

(58) Field of Classification Search
CPC ......... G06T 5/50; G06T 7/0002; G06T 5/003; G06T 7/90; G06T 2207/20021;
(Continued)

(56) References Cited

U.S. PATENT DOCUMENTS

2002/0025164 A1   2/2002   Suzuki
2002/0196472 A1*  12/2002  Enomoto .................. H04N 1/58
                                                                      358/3.26
(Continued)

FOREIGN PATENT DOCUMENTS

JP   2002-125156 A   4/2002
JP   2013-162280 A   8/2013
(Continued)

OTHER PUBLICATIONS

International Search Report and Written Opinion of PCT Application No. PCT/JP2017/028104, dated Oct. 24, 2017, 08 pages of ISRWO.

(Continued)

*Primary Examiner* — Timothy J Henn
(74) *Attorney, Agent, or Firm* — Chip Law Group

(57) ABSTRACT

The present technology relates to an image processing device, an image processing method, and an imaging device capable of correcting an image according to characteristics peculiar to each lens without executing an individual adjustment process. An image processing device according to a first aspect of the present technology includes a quantitative value calculating unit which calculates a quantitative value of a sample image based on an obtained image, an average (Continued)

value calculating unit which calculates an average value of the quantitative values calculated from a plurality of the sample images, a holding unit which holds the calculated average value of the quantitative values, and a correcting unit which corrects an imaged image on the basis of the held average value of the quantitative values. The present technology can be applied to a digital camera.

17 Claims, 21 Drawing Sheets

(51) Int. Cl.
| | |
|---|---|
| H04N 5/357 | (2011.01) |
| H04N 5/217 | (2011.01) |
| H04N 5/247 | (2006.01) |
| G06T 7/90 | (2017.01) |
| G06T 5/00 | (2006.01) |
| G06T 7/00 | (2017.01) |
| H04N 5/225 | (2006.01) |
| H04N 9/64 | (2006.01) |
| H04N 17/00 | (2006.01) |

(52) U.S. Cl.
CPC ............ *H04N 5/217* (2013.01); *H04N 5/2253* (2013.01); *H04N 5/2254* (2013.01); *H04N 5/232* (2013.01); *H04N 5/23209* (2013.01); *H04N 5/23232* (2013.01); *H04N 5/23238* (2013.01); *H04N 5/247* (2013.01); *H04N 5/3572* (2013.01); *H04N 9/646* (2013.01); *H04N 17/002* (2013.01); *G06T 2207/20021* (2013.01)

(58) Field of Classification Search
CPC .............. H04N 5/23209; H04N 5/247; H04N 5/23238; H04N 5/217; H04N 5/3572; H04N 5/232; H04N 17/002; H04N 9/646; H04N 5/23232; H04N 5/2254; H04N 5/2253; H04N 5/23267; G03B 17/14
See application file for complete search history.

(56) References Cited

U.S. PATENT DOCUMENTS

| | | | |
|---|---|---|---|
| 2012/0249828 A1 | 10/2012 | Sun | |
| 2013/0329122 A1* | 12/2013 | Geisler | H04N 5/235 348/345 |
| 2014/0003734 A1* | 1/2014 | Umansky | G06T 5/003 382/275 |
| 2014/0085505 A1* | 3/2014 | Asuka | H04N 5/3572 348/229.1 |
| 2015/0248776 A1* | 9/2015 | Kasahara | G06T 11/006 348/222.1 |
| 2018/0131863 A1* | 5/2018 | Teyssier | G06T 5/50 |

FOREIGN PATENT DOCUMENTS

| | | |
|---|---|---|
| JP | 2015-216576 A | 12/2015 |
| JP | 2016-019092 A | 2/2016 |

OTHER PUBLICATIONS

Extended European Search Report of EP Application No. 178413845, dated Jul. 22, 2019, 09 pages.

* cited by examiner

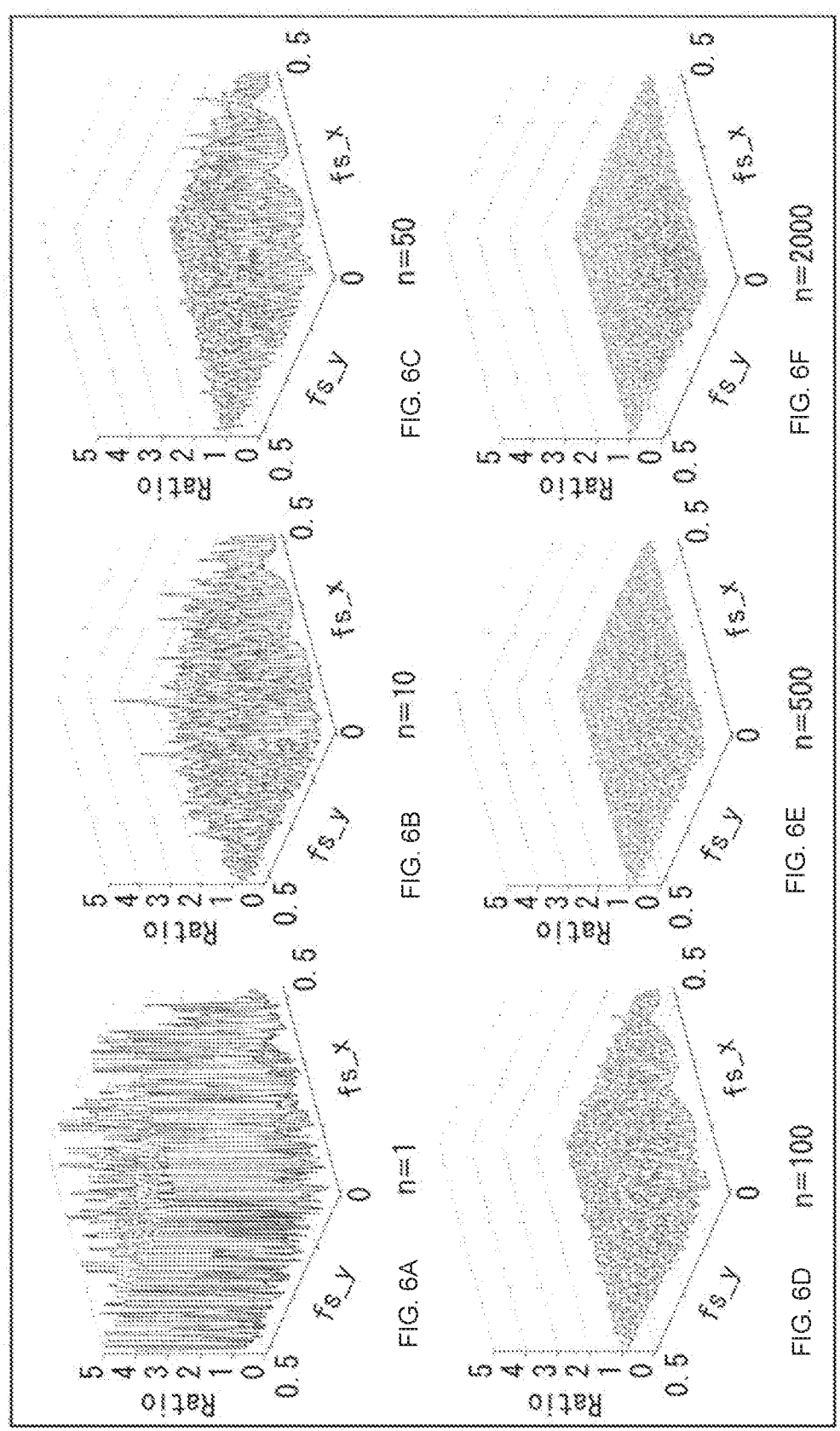

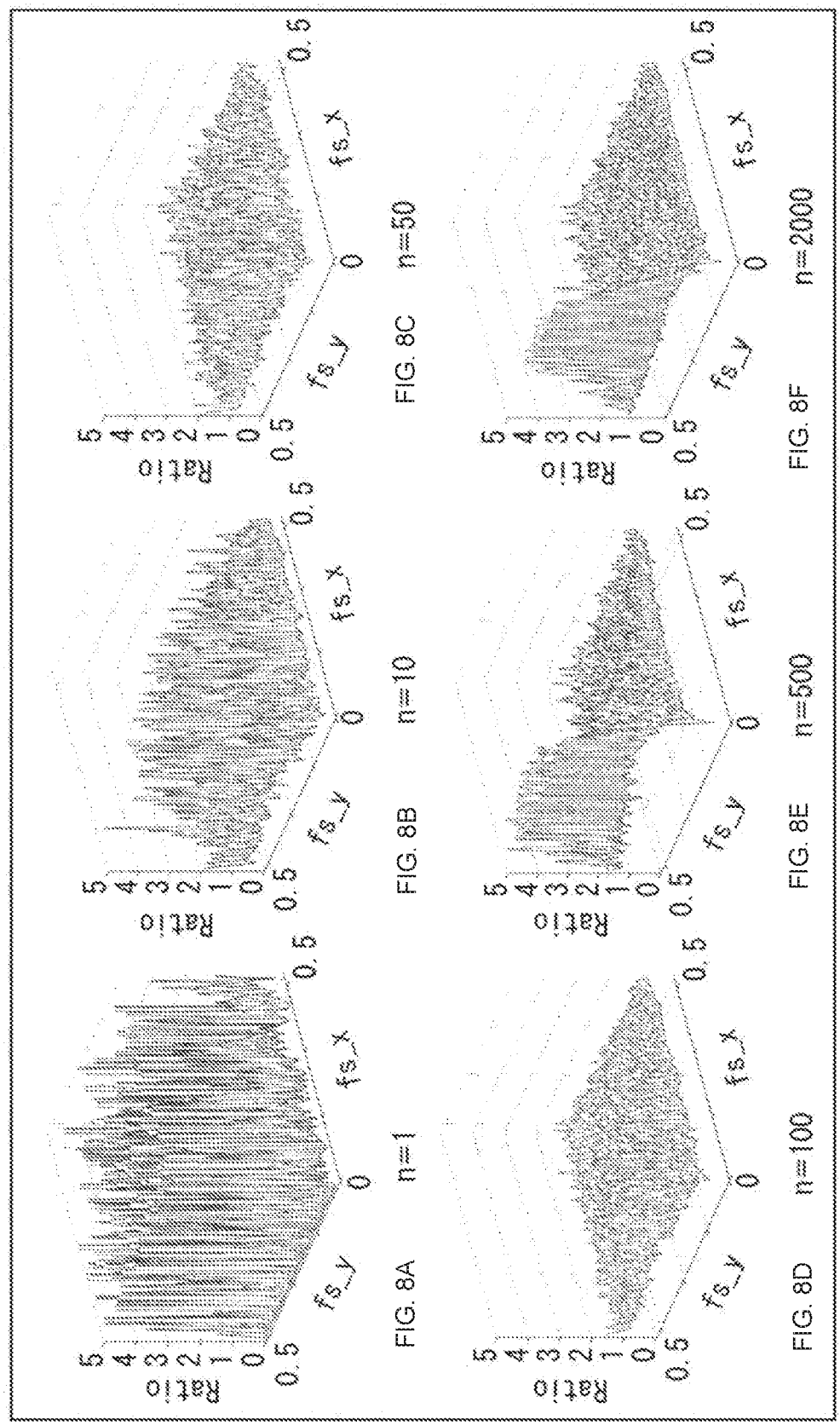

FIG. 18
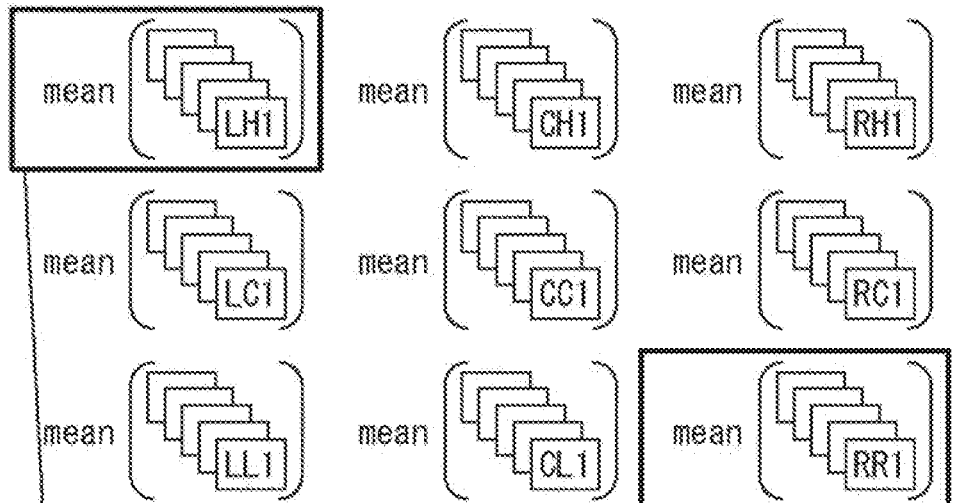
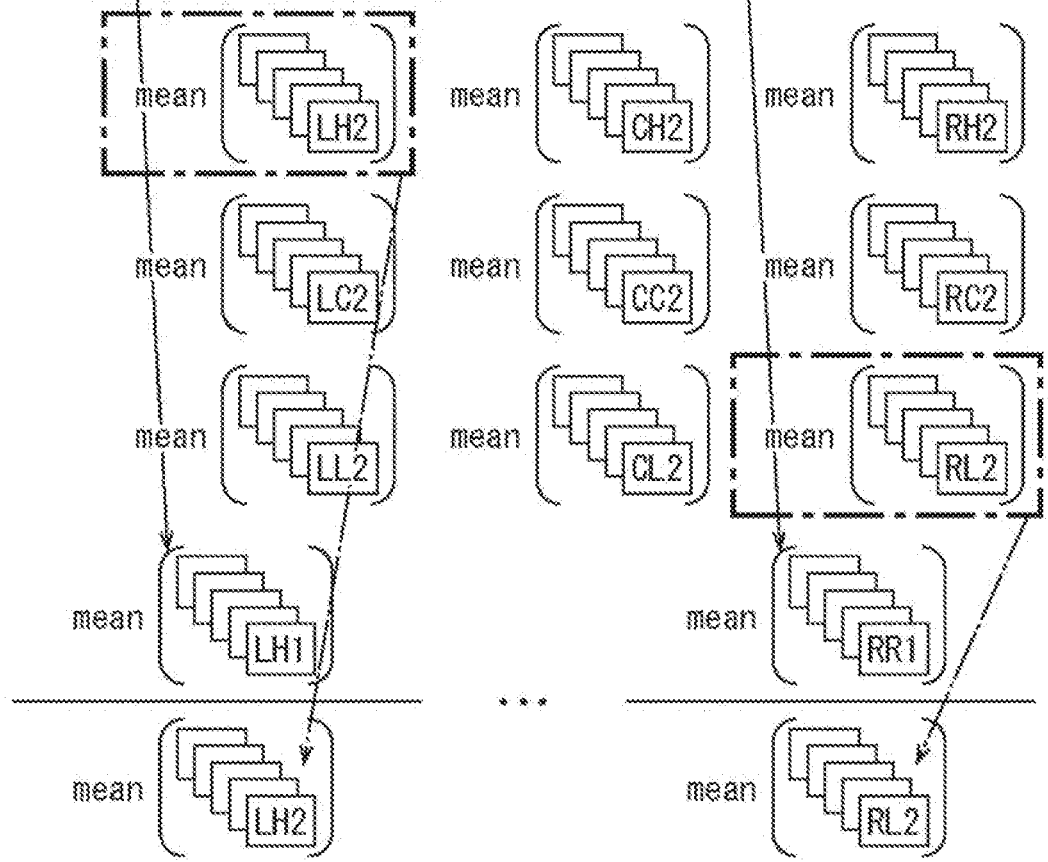

ND IMAGING
IMAGE PROCESSING DEVICE, IMAGE PROCESSING METHOD, AND IMAGING DEVICE

CROSS REFERENCE TO RELATED APPLICATIONS

This application is a U.S. National Phase of International Patent Application No. PCT/JP2017/028104 filed on Aug. 2, 2017, which claims priority benefit of Japanese Patent Application No. JP 2016-159546 filed in the Japan Patent Office on Aug. 16, 2016. Each of the above-referenced applications is hereby incorporated herein by reference in its entirety.

TECHNICAL FIELD

The present technology relates to an image processing device, an image processing method, and an imaging device, and more particularly, to an image processing device, an image processing method, and an imaging device capable of correcting image deterioration peculiar to a lens such as a partial blur.

BACKGROUND ART

Partial blur has been known as image deterioration caused by a problem peculiar to each lens of an imaging device. Main cause of the partial blur includes a manufacturing error of a lens in a manufacturing process of a lens/camera module and an error at the time of assembling members, and a degree is different depending on each individual. Therefore, to effectively correct the partial blur, it is required to execute an individual adjustment process in a manufacturing process. Specifically, the characteristic peculiar to each lens is measured by imaging a predetermined pattern, and individual resolution correction according to the measurement result is executed (for example, refer to Patent Document 1).

CITATION LIST

Patent Document

Patent Document 1: Japanese Patent Application Laid-Open No. 2015-216576

SUMMARY OF THE INVENTION

Problems to be Solved by the Invention

As described above, when the individual adjustment process is included in the manufacturing process, the cost increases. Furthermore, it has not been possible to correct image deterioration such as a partial blur which may be caused by an accident after shipment such as collision or dropping of the lens.

The present technology has been made in view of such circumstances, and an object of the present technology is to reduce cost without requiring an individual adjustment process in a manufacturing process and to correct image deterioration caused by an accident after shipment.

Solutions to Problems

An image processing device according to a first aspect of the present technology includes a quantitative value calculating unit which calculates a quantitative value of a sample image based on an obtained image, an average value calculating unit which calculates an average value of the quantitative values calculated from a plurality of the sample images, a holding unit which holds the calculated average value of the quantitative values, and a correcting unit which corrects an imaged image on the basis of the held average value of the quantitative values.

The quantitative value calculating unit can divide the sample image into a plurality of regions and calculate the quantitative value for each region, and the average value calculating unit can calculate an average value of the quantitative values calculated for each region of a plurality of the sample images.

The correcting unit can calculate an image correction value on the basis of the average value and correct an imaged image on the basis of the calculated image correction value.

The average value calculating unit can further calculate a ratio between the average values of the quantitative values of different regions, the holding unit can further hold the ratio between the average values of the quantitative values of the different regions, and the correcting unit can correct the imaged image according to the held ratio between the average values of the quantitative values of the different regions.

The quantitative value calculating unit can calculate a power spectrum as a quantitative value of the sample image, and the correcting unit can correct the imaged image on the basis of the average value of the power spectrum as the held quantitative value.

The correcting unit can correct a resolution of an imaged image.

The average value calculating unit can calculate a ratio between the average values of the power spectra of regions which are horizontally arranged with respect to a gravity direction of the sample image, and the correcting unit can correct a partial blur of an imaged image according to the held ratio between the average values of the power spectra of the regions which are horizontally arranged with respect to the gravity direction of the sample image.

The average value calculating unit can calculate a ratio between the average values of the power spectra of a center region and a peripheral region of the sample image, and the correcting unit can correct a resolution of a peripheral region of an imaged image according to the held ratio between the average values of the power spectra of the center region and the peripheral region of the sample image.

The quantitative value calculating unit can calculate pixel value of each color component as a quantitative value of the sample image, and the correcting unit can correct color shading of an imaged image on the basis of an average value of the held pixel value of each color component as the quantitative value.

The average value calculating unit can calculate a ratio between the average values of the pixel values of each color component in respective regions which are arranged in a direction orthogonal to a gravity direction of the sample image, and the correcting unit can correct the color shading of the imaged image according to the held ratio between the average values of the pixel values of each color component of respective regions which are arranged in the direction orthogonal to the gravity direction of the sample image.

The correcting unit can correct an imaged image on the basis of the average value of the held quantitative values after the number of sample images becomes equal to or more than a threshold.

A selection unit which selects the sample image from the obtained images can be further included.

The selection unit can select the sample image by removing an image imaged with an ISO value higher than a predetermined ISO value, an image imaged with an exposure value higher or lower than a predetermined exposure value, and consecutively shot images from among the obtained images.

The holding unit can hold the calculated average value of the quantitative values in association with a component of an imaging unit used for imaging the sample image.

The imaging unit including an optical lens and an imaging element which generates a pixel signal in accordance with incident light collected by the optical lens can be further included.

The average value calculating unit can calculate a ratio between the average values of the power spectra of the regions at the same positions in the sample images respectively imaged by the plurality of different imaging devices, and the correcting unit can correct resolutions of the images imaged by the plurality of different imaging devices according to the held ratio between the average values of the power spectra of the regions at the same positions in the sample images respectively imaged by the plurality of different imaging devices.

The holding unit can hold the calculated average value of the quantitative values in association with an imaging device used for imaging the sample image.

An image processing method, executed by the image processing device, according to a first aspect of the present technology includes a quantitative value calculating step of calculating a quantitative value of a sample image based on an obtained image, an average value calculating step of calculating an average value of the quantitative values calculated from a plurality of the sample images, a holding step of holding the calculated average value of the quantitative values, and a correcting step of correcting an imaged image on the basis of the held average value of the quantitative values.

In the first aspect of the present technology, the quantitative value of the sample image based on the obtained image is calculated, the average value of the quantitative values calculated from a plurality of the sample images is calculated and held, and the imaged image is corrected on the basis of the held average value of the quantitative values.

An imaging device according to a second aspect of the present technology includes an optical lens, an imaging element which generates a pixel signal in accordance with incident light collected by the optical lens, an obtaining unit which obtains an image including the pixel signal, a quantitative value calculating unit which calculates a quantitative value of a sample image based on the obtained image, an average value calculating unit which calculates an average value of the quantitative values calculated from a plurality of the sample images, a holding unit which holds the calculated average value of the quantitative values, and a correcting unit which corrects an imaged image on the basis of the held average value of the quantitative values.

At least one of the optical lens or the imaging element can be detachable and exchangeable.

In the second aspect of the present technology, the pixel signal is generated in accordance with incident light collected by the optical lens, an image including the pixel signal is obtained, the quantitative value of the sample image based on the obtained image is calculated, the average value of the quantitative values calculated from a plurality of the sample images is calculated and held, and the imaged image is corrected on the basis of the held average value of the quantitative values.

Effects of the Invention

According to the first and second aspects of the present technology, it is possible to reduce cost without requiring an individual adjustment process in a manufacturing process and to correct image deterioration caused by an accident after shipment.

BRIEF DESCRIPTION OF DRAWINGS

FIGS. 6A, 6B, 6C, 6D, 6E, and 6F are diagrams of a change in a ratio between average values of the power spectra of the regions that are bilaterally symmetrical with respect to the gravity direction relative to a change in the number of sample images.

FIGS. 8A, 8B, 8C, 8D, 8E, and 8F are diagrams of a change in a ratio between average values of the power spectra of the regions that are not bilaterally symmetrical with respect to the gravity direction relative to a change in the number of sample images.

FIG. 18 is a diagram for explaining DB updating processing of an image processing device of the stereo camera system.

MODE FOR CARRYING OUT THE INVENTION

Hereinafter, best modes (referred to as embodiments below) for carrying out the present technology will be described in detail with reference to the drawings.

<Exemplary Configuration of Imaging Device According to Embodiment of Present Technology>

Figure 1:
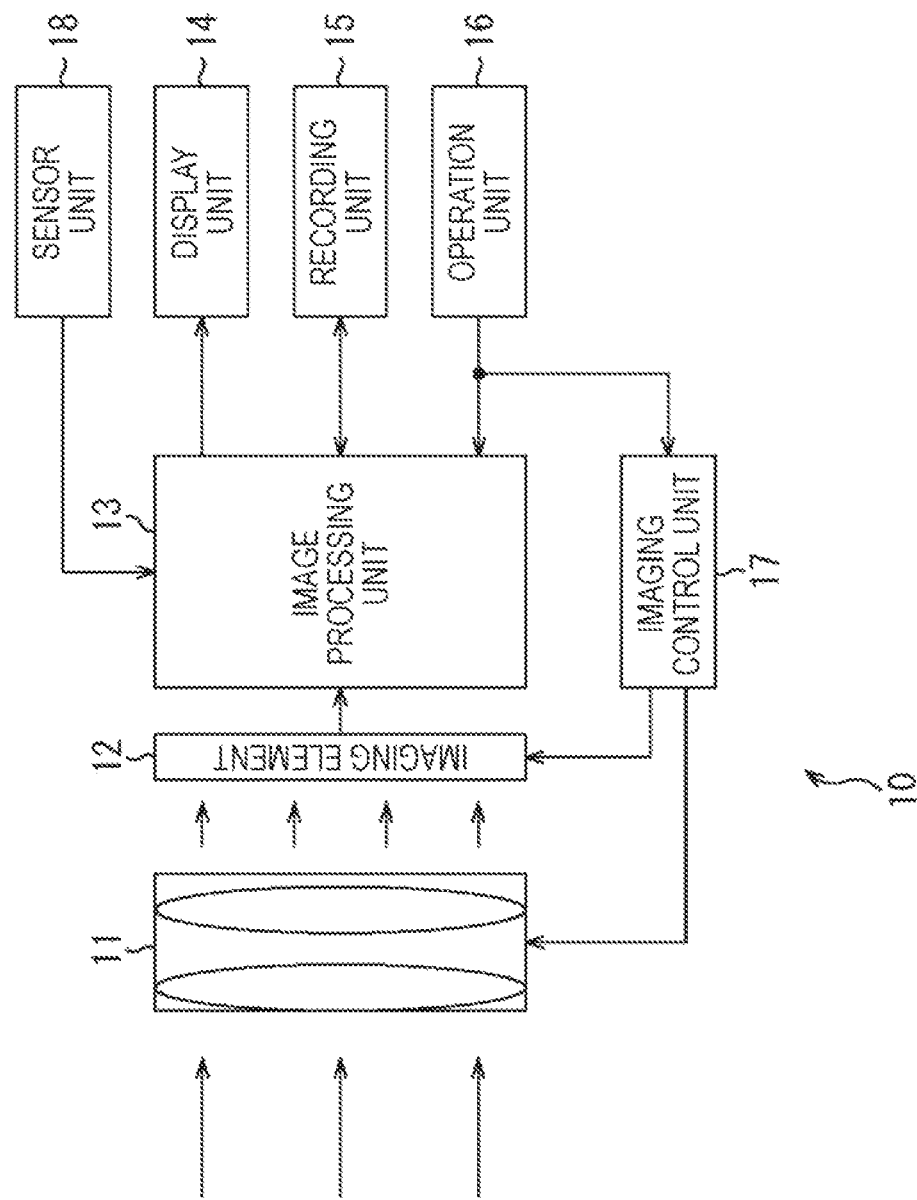
FIG. 1 is a block diagram of an exemplary configuration of an imaging device to which the present technology has been applied.

FIG. 1 is a block diagram of an exemplary configuration of an imaging device according to an embodiment of the present technology.

An imaging device 10 includes an optical lens 11, an imaging element 12, an image processing unit 13, a display unit 14, a recording unit 15, an operation unit 16, an imaging control unit 17, and a sensor unit 18.

The optical lens 11 includes a plurality of lenses, a diaphragm, and the like and focuses an optical image of a subject and makes the light enter the imaging element 12 in a subsequent stage.

The imaging element 12 includes, for example, a rear surface irradiation type CMOS image sensor and the like, and performs photoelectric conversion in accordance with incident light collected by the optical lens 11 to generate a pixel signal of each pixel and output the signal to the image processing unit 13.

Note that the optical lens 11 and the imaging element 12 may be removable from the imaging device 10. In that case, the imaging device 10 obtains identification information of the optical lens 11 and the imaging element 12 which are attached and makes a memory 27 (FIG. 2) be capable of holding the identification information.

The image processing unit 13 includes a signal processing circuit such as a CPU, and executes predetermined image processing (developing processing, various correcting processing, and the like) on the pixel signal input from the imaging element 12 and outputs image data which is obtained as a result of the above processing to the display unit 14 and the recording unit 15. Note that various correcting processing of the image processing unit 13 will be described in detail below.

However, partial blur correcting processing, peripheral resolution correcting processing, and color shading correcting processing by the image processing unit 13 can be canceled according to settings by a user. With this structure, for example, in a case where an old optical lens 11 having uneven optical characteristics is attached to the imaging device 10, the uneven optical characteristics of the old optical lens 11 can be intentionally left in an image.

The display unit 14 displays a through image for composition confirmation, an imaged (recorded) image, a reproduced image, and the like. Furthermore, the display unit 14 displays various setting information and the like. The recording unit 15 records image data of the imaged image in a semiconductor memory and the like and reproduces the image data. The operation unit 16 includes buttons and dials formed on a housing and a touch panel and the like laminated on the display unit 14 and receives an operation input from a user and notifies the image processing unit 13 and the imaging control unit 17 of an operation signal corresponding to the operation input.

The imaging control unit 17 includes a control circuit such as a CPU and controls driving of the optical lens 11 and the imaging element 12 according to the operation signal notified from the operation unit 16.

The sensor unit 18 detects a position (latitude, longitude, altitude), an imaging direction, a gravity direction, and the like of the imaging device 10.

<Exemplary Configuration of Image Processing Unit 13>

Figure 2:
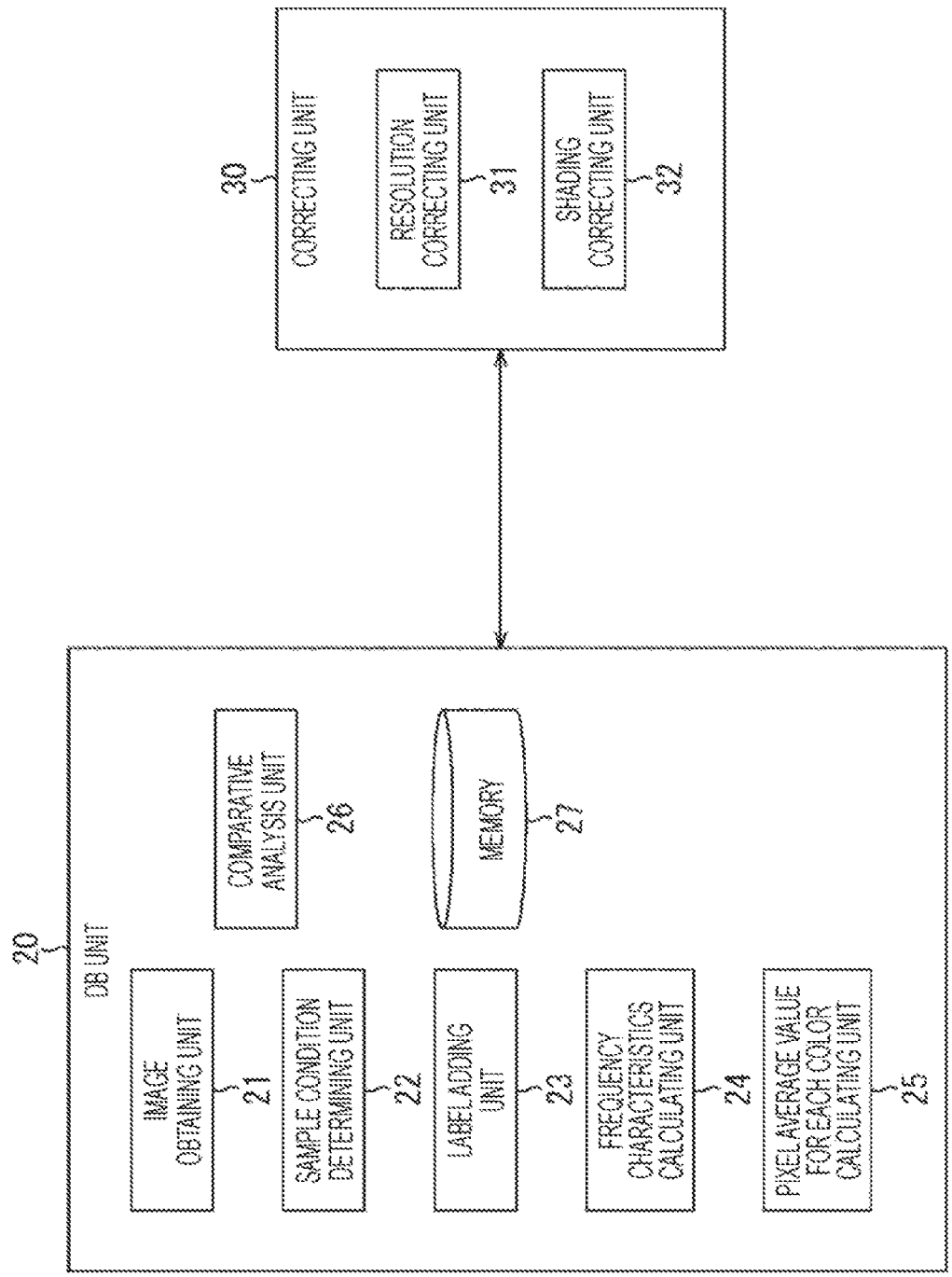
FIG. 2 is a block diagram of an exemplary configuration of an image processing unit.

Next, FIG. 2 illustrates an exemplary configuration to execute the partial blur correcting processing, the peripheral resolution correcting processing, and the color shading correcting processing regarding the present technology among various correcting processing executed by the image processing unit 13.

In other words, the image processing unit 13 includes a database (DB) unit 20 and a correcting unit 30 to execute the partial blur correcting processing, the peripheral resolution correcting processing, and the color shading correcting processing.

The DB unit 20 accumulates and updates information to execute the partial blur correcting processing and the like described above, and includes an image obtaining unit 21, a sample condition determining unit 22, a label adding unit 23, a frequency characteristics calculating unit 24, a pixel average value for each color calculating unit 25, a comparative analysis unit 26, and the memory 27.

The image obtaining unit 21 obtains a pixel signal (referred to as image below) for one frame, to which the image processing is not executed yet, output from the imaging element 12 each time when an image is imaged and supplies the pixel signal to the sample condition determining unit 22. The sample condition determining unit 22 determines whether or not it is appropriate to use the supplied image for update of the memory 27 as a sample and supplies an image which can be used as a sample (referred to as a sample image below) to the label adding unit 23.

Here, the image which can be used as a sample is not an image obtained by imaging a predetermined pattern and the like and is a general image obtained by imaging an arbitrary subject. However, images, such as an image having much noise since the image is imaged with an ISO value larger than a predetermined ISO value, an image which is imaged with an exposure value higher (or lower) than a predetermined exposure value and is imaged for high dynamic range (HDR) synthesis, for example, and consecutively shot images, which does not affect an object to cancel the power spectrum of the subject for calculating the average value of the pixel values of the large number of images and adversely affects the object are excluded from the sample. Note that, for example, in a case where images are continuously and sequentially imaged such as a case of a drive recorder and the like, it is possible to periodically extract images and use the extracted images as samples.

The label adding unit 23 determines the gravity direction in the sample image on the basis of the detection result of the sensor unit 18 and applies a label indicating the gravity direction to the image. Furthermore, the label adding unit 23 estimates a light source (sunlight, light bulb, fluorescent lamp, or the like or color temperature) in a sample image imaging environment and applies a label indicating the light source to the image.

In addition, in a case where the optical lens 11 and the imaging element 12 can be removed from and replaced with respect to the imaging device 10, the label adding unit 23 can apply the label indicating the identification information of the optical lens 11 and the imaging element 12 to the sample image.

Figure 3:
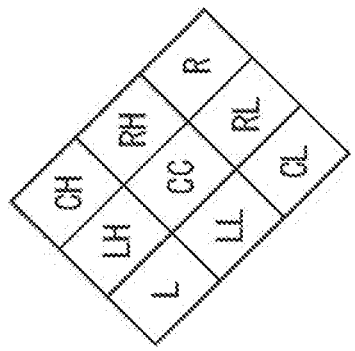
FIGS. 3A, 3B, and 3C are diagrams of kinds of gravity direction.

In FIGS. 3A, 3B, and 3C, a state where the label adding unit 23 determines the gravity direction is illustrated. The gravity direction is determined as at least one of two kinds of cases including a case where a downward direction of a horizontally long sample image is the gravity direction as illustrated in FIG. 3A (0° direction) and a case where a downward direction of a vertically long sample image is the gravity direction as illustrated in FIG. 3B (90° direction).

Note that, a case where a downward direction of the sample image which is obliquely placed is the gravity direction as illustrated in FIG. 3C (45° direction) is added to the above cases, and it is possible to determine the gravity direction from among the three kinds of cases. However, in a case where the number of kinds of the gravity direction is three, although accuracy at the time of correction is improved, a calculation cost increases. Therefore, depending on which one of the accuracy or the calculation cost is focused, a user may select the number of kinds of the gravity directions from two or three. Of course, equal to or more than four kinds may be used to further improve the accuracy.

The description returns to FIG. 2. The frequency characteristics calculating unit 24 divides the sample image into a plurality of regions, calculates a power spectrum for each region, and outputs the power spectrum to the comparative analysis unit 26. In a case where the pixel signal of the sample image has a plurality of colors, the power spectrum may be calculated by using one or more kinds of the colors.

Figure 4:
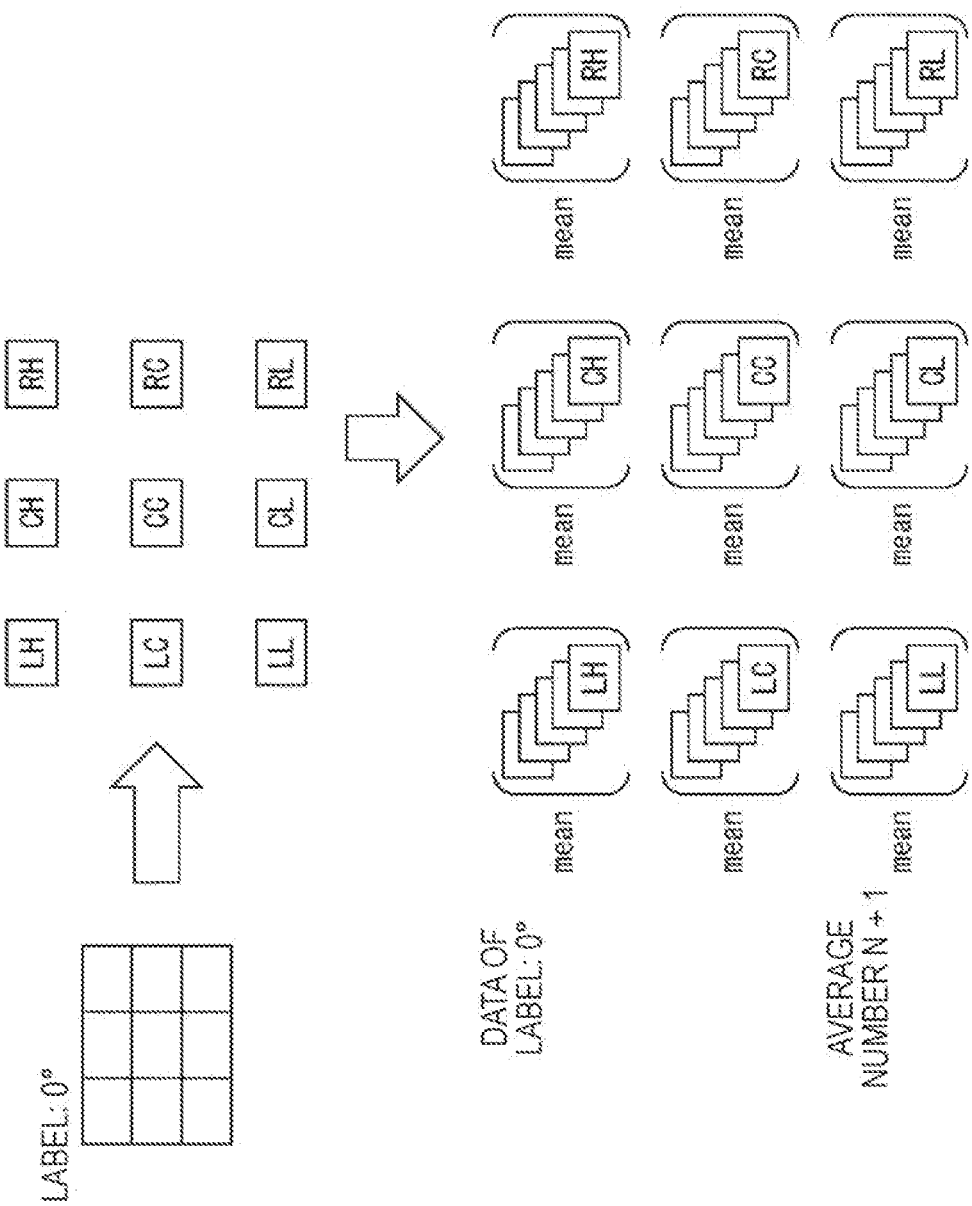
FIG. 4 is a diagram of an example in which an image to be a sample is divided into a plurality of regions.

In FIG. 4, an example is illustrated in which the frequency characteristics calculating unit 24 divides the sample image into the plurality of regions. In a case of FIG. 4, the sample image is divided into 3×3 regions. In the following description, a case will be described where the sample image is divided into 3×3 regions as an example. Furthermore, as assuming that the gravity direction of the sample image is a downward direction, an upper left region is referred to as LH, an upper central region is referred to as CH, an upper right region is referred to as RH, a left middle region is referred to as LC, a central middle region is referred to as CC, a right middle region is referred to as RC, a lower left region is referred to as LL, a lower central region is referred to as CL, and a lower right region is referred to as RL.

However, the number of regions obtained by dividing the sample image is an arbitrary number of equal to or more than two, and an area of each region can be reduced to a degree that the power spectrum in the region can be detected. In a case where the number of divided regions of the sample image is increased, although the accuracy at the time of correction is improved, the calculation cost is increased. Therefore, depending on which one of the accuracy or the calculation cost is focused, the number of regions obtained by dividing the sample image may be determined. Furthermore, it is possible that the user selects the number of regions obtained by dividing the sample image.

Here, power spectra of the regions that are bilaterally symmetrical with respect to the gravity direction will be described with reference to FIGS. 5A, 5B, 5C, 6A, 6B, 6C, 6D, and 6E.

Figure 5A:
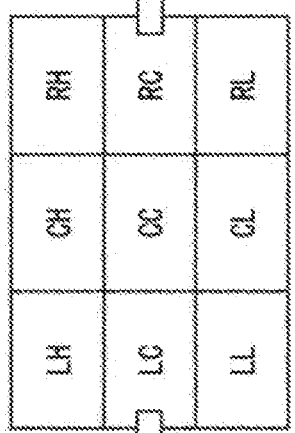
FIGS. 5A, 5B, and 5C are diagrams of power spectra of regions in a single sample image that are bilaterally symmetrical with respect to the gravity direction.
Figure 5B:
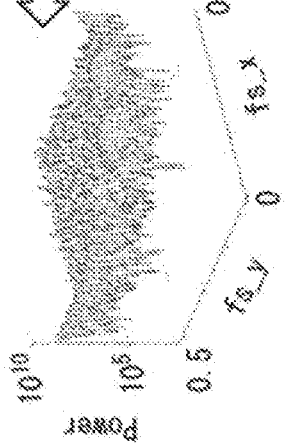
Figure 5C:
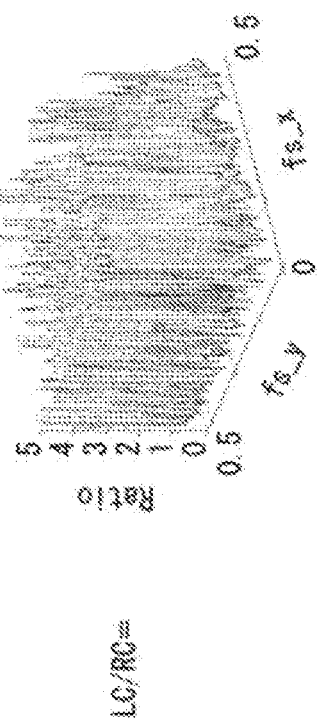

FIGS. 5A, 5B, and 5C illustrate power spectra of the regions LC and RC that are bilaterally symmetrical with respect to the gravity direction in a single sample image.

FIG. 5A is a three-dimensional graph of the power spectrum of the region LC. FIG. 5B is a three-dimensional graph of the power spectrum of the region RC. As illustrated in FIGS. 5A and 5B, since the power spectra of the regions LC and RC depend on the subjects in the respective regions, the power spectra are normally different from each other.

FIG. 5C is a three-dimensional graph of a ratio of the power spectra of the regions LC and RC that are bilaterally symmetrical with respect to the gravity direction (power spectrum of region LC/power spectrum of region RC).

FIGS. 6A, 6B, 6C, 6D, 6E, and 6F illustrate a change in the ratio of the average values of the power spectra of the regions LC and RC in a case where the number n of the sample images is gradually increased.

In a case where the number n of the sample images is one, as illustrated in FIG. 5C, the ratio of the power spectra between the regions that are bilaterally symmetrical with respect to the gravity direction clearly indicates a difference between the power spectra of the subject in the regions. However, as illustrated in FIGS. 6A, 6B, 6C, 6D, 6E, and 6F, when the number n of the sample images is gradually increased, the difference between the power spectra of the subject in the respective regions that are bilaterally symmetrical with respect to the gravity direction is canceled, and only the power spectrum of the optical lens 11 of the imaging device 10 is extracted. Therefore, if there is no lateral difference in the resolution of the optical lens 11 of the imaging device 10, the ratio between the power spectra of the regions that are bilaterally symmetrical with respect to the gravity direction converges to one. In other words, the ratio is different from one in a state where the number n of the sample images is sufficiently increased, this difference is caused by a partial blur due to the lateral difference in the resolution of the optical lens 11. Therefore, when resolution correcting processing in which the intensity can be adjusted asymmetrically with respect to the optical axis is executed in a direction to cancel the partial blur, the partial blur can be corrected.

Next, power spectra of the regions that are not bilaterally symmetrical with respect to the gravity direction will be described with reference to FIGS. 7A, 7B, 7C, 8A, 8B, 8C, 8D, and 8E.

Figures 7A, 7B, 7C:
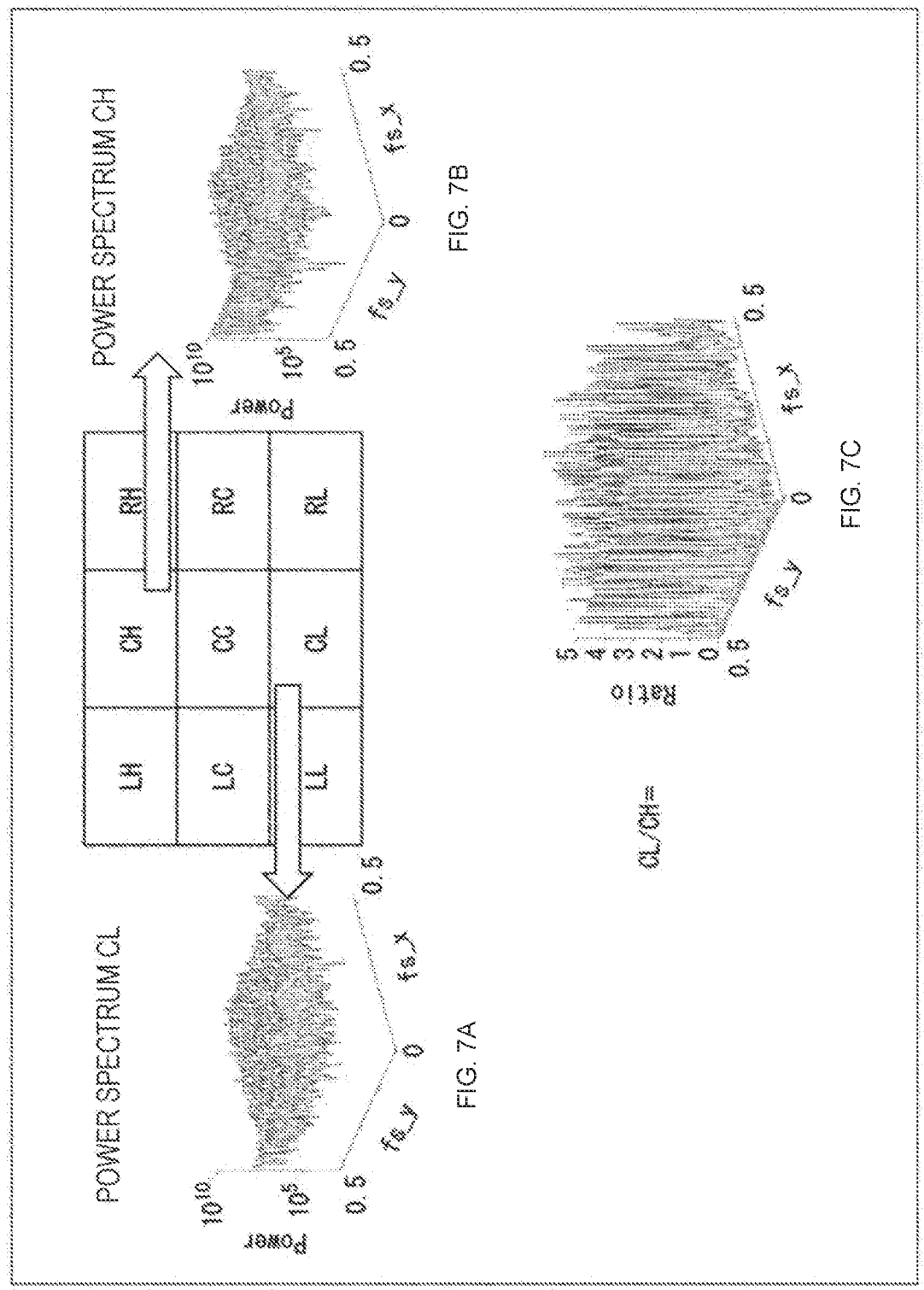
FIGS. 7A, 7B, and 7C are diagrams of power spectra of regions in a single sample image that are not bilaterally symmetrical with respect to the gravity direction.

FIGS. 7A, 7B, and 7C illustrate power spectra of the regions CL and CH that are not bilaterally symmetrical with respect to the gravity direction in a single sample image.

FIG. 7A is a three-dimensional graph of the power spectrum of the region CL. FIG. 7B is a three-dimensional graph of the power spectrum of the region CH. As illustrated in FIGS. 7A and 7B, since the power spectra of the regions CH and CH depend on the subjects in the respective regions, the power spectra are normally different from each other.

FIG. 7C is a three-dimensional graph of a ratio of the power spectra of the regions CL and CH that are not bilaterally symmetrical with respect to the gravity direction (power spectrum of region CL/power spectrum of region CH).

FIGS. 8A, 8B, 8C, 8D, 8E, and 8F illustrate a change in the ratio of the average values of the power spectra of the regions CL and CH in a case where the number of sample images is gradually increased.

In a case where the number n of the sample images is one, as illustrated in FIG. 7C, the ratio between the power spectra of the regions that are not bilaterally symmetrical with respect to the gravity direction clearly indicates a difference between the power spectra of the subjects in the regions, similarly to the ratio between the power spectra of the regions that are bilaterally symmetrical with respect to the gravity direction illustrated in FIGS. 5A, 5B, and 5C. However, as illustrated in FIGS. 8A, 8B, 8C, 8D, 8E, and 8F, it is found that, even when the number n of the sample images is gradually increased, the difference between the power spectra of the subjects in the regions that are not bilaterally symmetrical with respect to the gravity direction is not canceled. Therefore, even when the number n of the sample images is sufficiently increased, the ratio between the power spectra of the regions that are not bilaterally symmetrical with respect to the gravity direction does not converge to one.

Therefore, in a case where the number n of the sample images is sufficiently large, and in a case where the ratio between the power spectra of the regions that are bilaterally symmetrical with respect to the gravity direction is different from one, it can be determined that the difference is derived from the characteristics peculiar to an optical system (optical lens 11) and causes the partial blur.

The description returns to FIG. 2. Similarly to the frequency characteristics calculating unit 24, the pixel average value for each color calculating unit 25 divides the sample image into the plurality of regions, calculates an average value of each color component for each region, and outputs the value to the comparative analysis unit 26. Note that, it is preferable that any one of an arithmetic mean (arithmetic average), a geometric mean (geometric average), a harmonic mean, adjustment average (trim average), and the like be applied to calculate the average value.

Each time when the power spectrum of each region of the sample image is input from the frequency characteristics calculating unit 24, the comparative analysis unit 26 reads the average value of the power spectra of each region of the sample image and the number n of the sample images which are registered for each label of the gravity direction in the memory 27, recalculates the average value by using the input from the frequency characteristics calculating unit 24, registers the number n+1 of the sample images obtained by incrementing the recalculated average value by one in the memory 27, and updates the number.

Furthermore, the comparative analysis unit 26 calculates the ratio between the average values of the power spectra of the regions that are bilaterally symmetrical with respect to the gravity direction (regions LH and RH, regions LC and RC, and regions LL and RL), registers the ratio in the memory 27, and updates the ratio. This ratio is a value separated from one in a case where the partial blur occurs and is referred when the partial blur correcting processing is executed. Note that, regarding the comparative analysis unit 26, the regions of which the ratio of the average values of the power spectra is calculated are not limited to the regions that are bilaterally symmetrical with respect to the gravity direction and may be a plurality of regions that are horizontally arranged.

Figure 9:
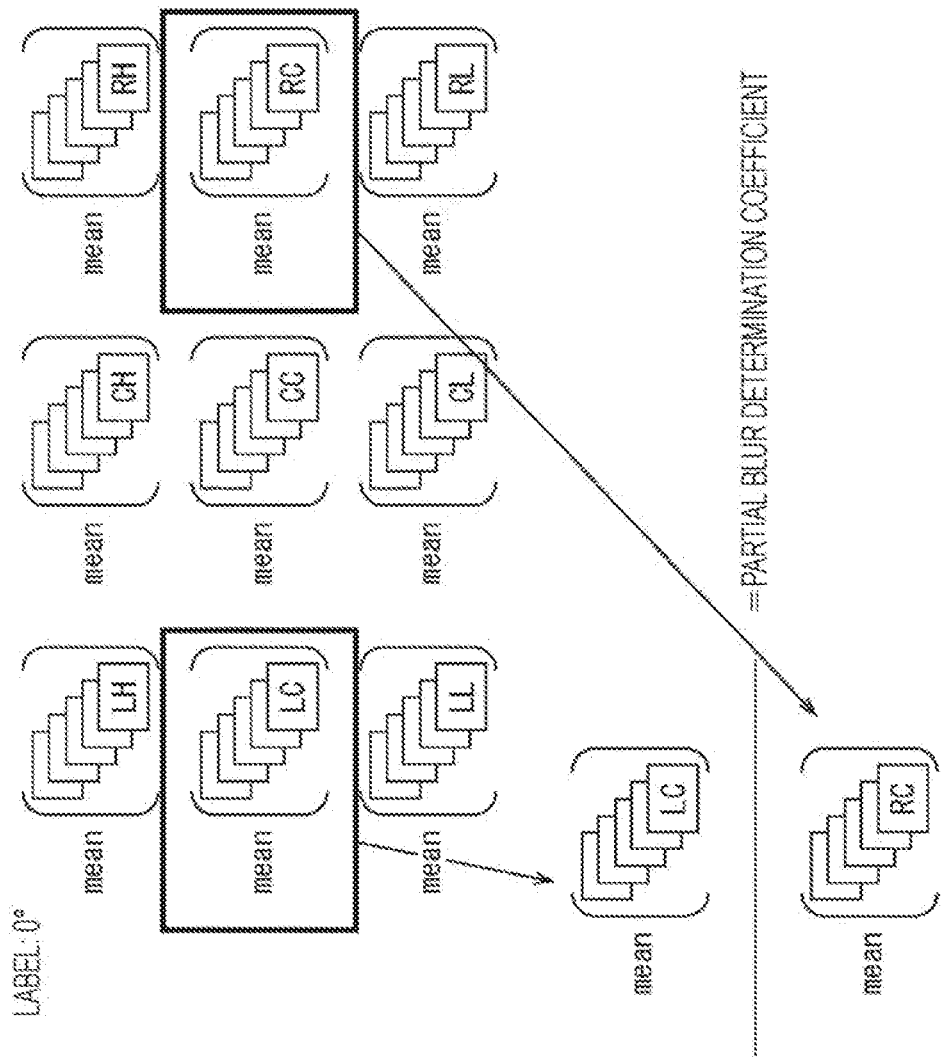
FIG. 9 is a diagram for explaining an operation of a comparative analysis unit.

FIG. 9 illustrates a case where the ratio between the average values of the power spectra of the regions LC and RC is calculated as an example of regions that are bilaterally symmetrical with respect to the gravity direction.

In addition, the comparative analysis unit 26 calculates ratios (region CH/region CC and the like) of the average values of the power spectra in the regions at the center and on the left side of an image (regions CH and LH, regions CC and LC, and regions CL and LL) and regions at the center and on the right side (regions CH and RH, regions CC and RC, and regions CL and RL), registers the ratio in the memory 27, and updates the ratio. A resolution in the center region is the highest in general, and a resolution in the peripheral region is low. Therefore, as the ratio gets smaller than one, a larger blur occurs in the peripheral region. Therefore, the ratio is referred when the peripheral resolution correcting processing is executed.

Figure 10:
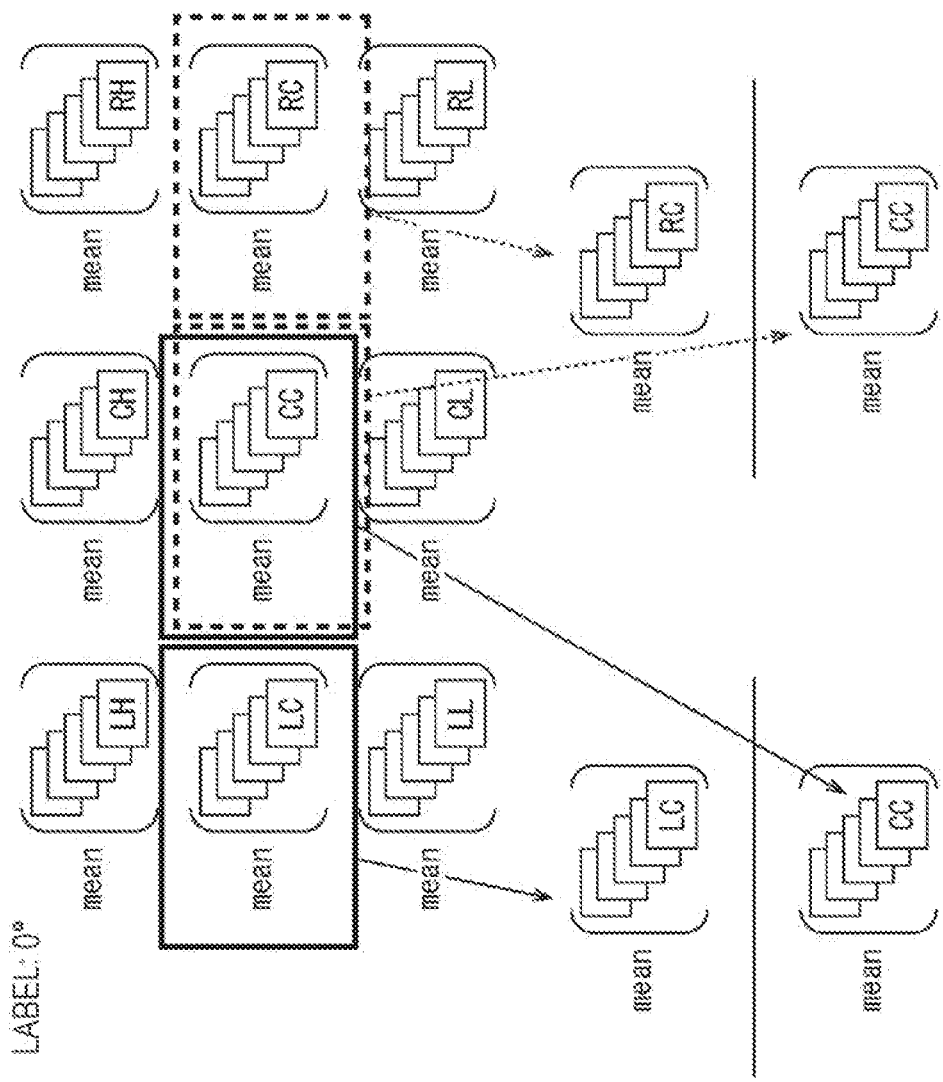
FIG. 10 is a diagram for explaining the operation of the comparative analysis unit.

FIG. 10 illustrates a case where the ratios (LC/CC and RC/CC) between the average values of the power spectra in the regions CC and LC as an example of the regions at the center and on the left side and the regions CC and RC as an example of the regions at the center and on the right side.

In addition, in addition, each time when the average value of each color component of each region of the sample image is input from the pixel average value for each color calculating unit 25, the comparative analysis unit 26 reads the average value of each color component of each region of each of the plurality of sample images and the number n of the samples which are registered in the memory 27 for each of the labels indicating the gravity direction and the light source, recalculates the average value by using the input from the pixel average value for each color calculating unit 25, registers the number n+1 of the sample images obtained by incrementing the recalculated average value by one in the memory 27, and updates the number.

Figure 11:
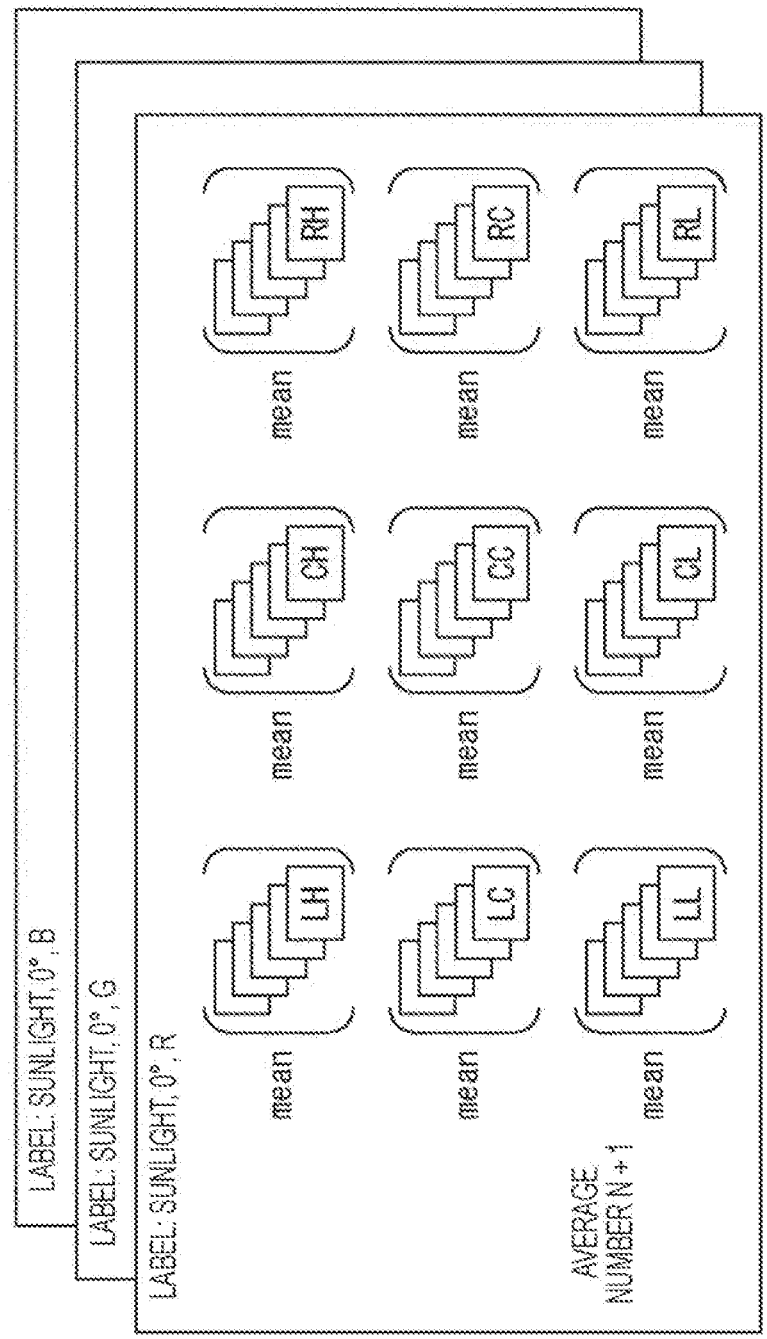
FIG. 11 is a diagram for explaining the operation of the comparative analysis unit.

FIG. 11 illustrates a state where the average value of each color component of each region of each of the plurality of sample images is registered in the memory 27 for each of the labels indicating the gravity direction and the light source.

Furthermore, the comparative analysis unit 26 reads the average value of each color component of each region of each of the plurality of sample images registered for each of the labels indicating the gravity direction and the light source in the memory 27, calculates the ratio between the average values of the same color component in the regions aligned in the direction orthogonal to the gravity direction (for example, regions CC and LC, regions CC and RC, and the like), registers the ratio in the memory 27, and updates the ratio. This ratio is referred when the color shading correcting processing is executed.

Figure 12:
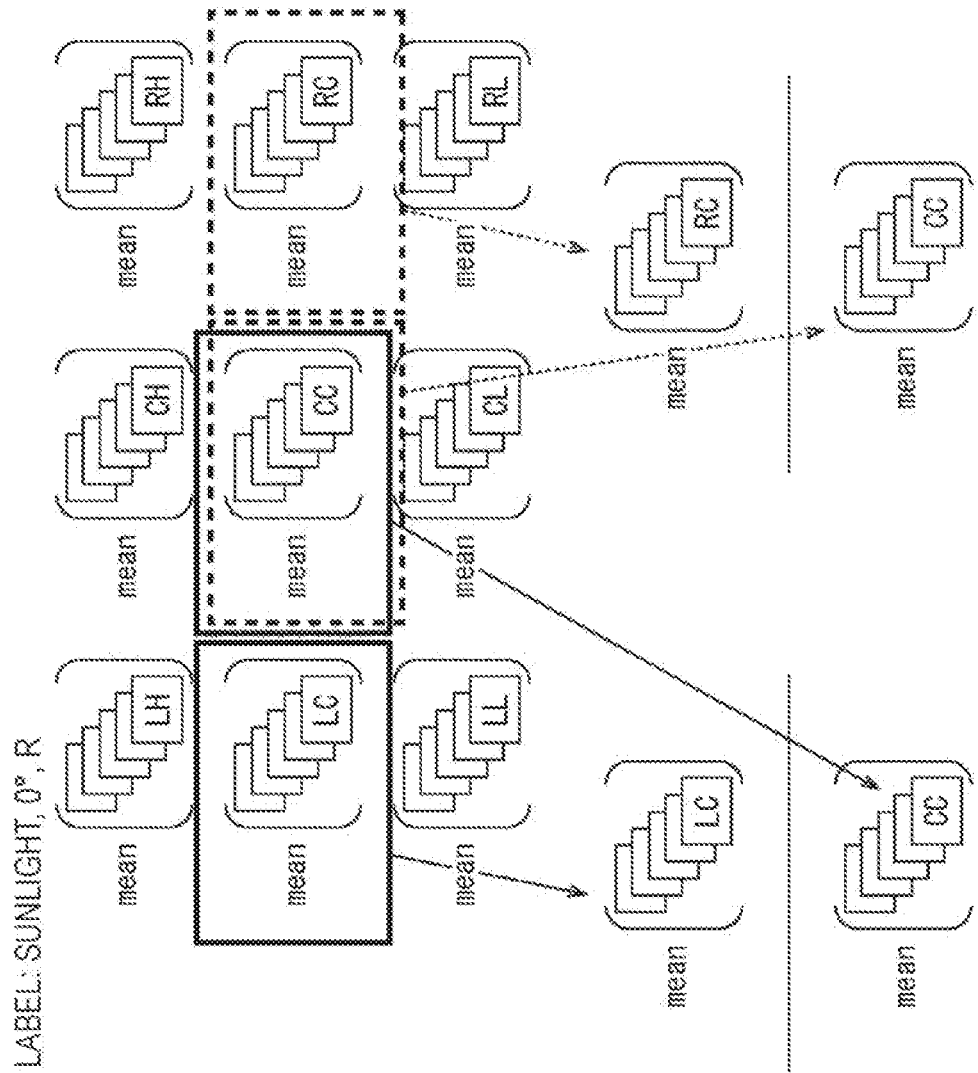
FIG. 12 is a diagram for explaining the operation of the comparative analysis unit.

FIG. 12 illustrates a case where a ratio between the average values of the same color component in the regions CC and LC and the regions CC and RC is calculated as an example of regions aligned in the direction orthogonal to the gravity direction.

Note that, in a case where the number n of the sample images is sufficiently large, a difference between the color components of the subject in the regions aligned in the direction orthogonal to the gravity direction is canceled, and only a change caused by the optical lens 11 and the imaging element 12 of the imaging device 10 is extracted. Therefore, if there is no shading in the optical lens 11 and the imaging element 12, the ratio between the average values of the same color component in the regions aligned in the direction orthogonal to the gravity direction converges to one. In other words, if the ratio is different from one in a state where the number n of the sample images is sufficiently increased, this difference is caused by shading due to the optical lens 11, the imaging element 12, and the like. Therefore, when a gain that can adjust intensity asymmetrically with respect to the optical axis is set in a direction to cancel the difference, the shading can be appropriately corrected.

The memory 27 includes a nonvolatile memory and the like and stores the average value of the power spectrum in each region of the sample image and the ratio between the regions which are input from the comparative analysis unit 26 and stores the number of samples used for the calculation. Furthermore, the memory 27 stores the average value of each color component in each region of the sample image and the ratio between the regions input from the comparative analysis unit 26 and stores the number of samples used for calculation.

Note that the memory 27 does not store the image data of the sample image itself, and it is preferable that the memory 27 have a capacity for storing various information described above.

The correcting unit 30 includes a resolution correcting unit 31 and a shading correcting unit 32. The resolution correcting unit 31 refers to the memory 27 and executes the partial blur correcting processing and the peripheral resolution correcting processing. The shading correcting unit 32 refers to the memory 27 and executes the color shading correcting processing.

<Regarding DB Updating Processing by DB Unit 20>

Next, DB updating processing by the DB unit 20 of the image processing unit 13 of the imaging device 10 will be described.

Figure 13:
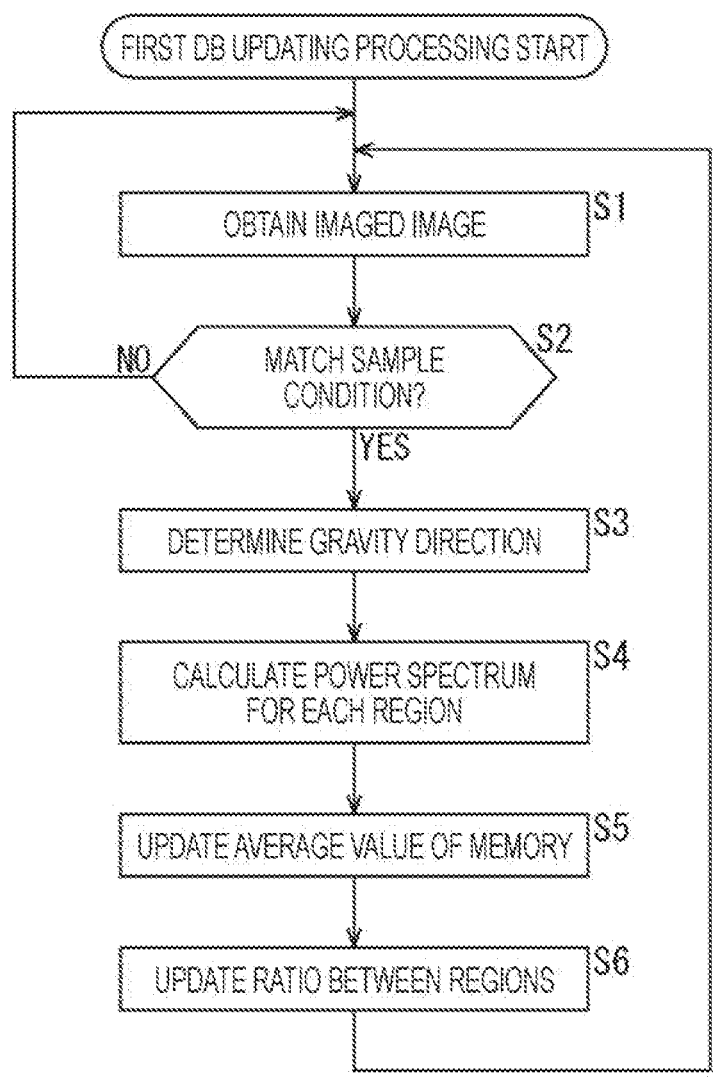
FIG. 13 is a flowchart for explaining first DB updating processing.

FIG. 13 is a flowchart for explaining first DB updating processing. The first DB updating processing is executed to register and update information in the memory 27 of the DB unit 20 which is referred when the partial blur correcting processing and the peripheral resolution correcting processing are executed.

In step S1, the image obtaining unit 21 obtains an image, to which the image processing is not executed, output from the imaging element 12 each time when an image is imaged and supplies the image to the sample condition determining unit 22. The sample condition determining unit 22 determines in step S2 whether or not the supplied image can be used as a sample image. In a case where it is determined that the image can be used as a sample image, the image obtaining unit 21 supplies the image to the label adding unit 23 as a sample image and proceeds the procedure to step S3. Conversely, in a case where it is determined that the image cannot be used as a sample image, the procedure returns to step S1.

In step S3, the label adding unit 23 determines the gravity direction in the sample image on the basis of the detection result of the sensor unit 18 and applies a label indicating the gravity direction to the image.

In step S4, the frequency characteristics calculating unit 24 divides the sample image into a plurality of regions, calculates a power spectrum for each region, and outputs the power spectrum to the comparative analysis unit 26.

In step S5, each time when the power spectrum of each region of the sample image is input from the frequency characteristics calculating unit 24, the comparative analysis unit 26 reads the average value of the power spectrum of each region of the sample image and the number n of the sample images which are registered for each label of the gravity direction in the memory 27, recalculates the average value by using the input from the frequency characteristics calculating unit 24, registers the number n+1 of the sample images obtained by incrementing the recalculated average value by one in the memory 27, and updates the number.

In step S6, the comparative analysis unit 26 calculates the ratio between the average values of the power spectra of the regions that are bilaterally symmetrical with respect to the gravity direction, that is, the regions at the center and on the left side, and the regions at the center and on the right side, and registers the ratio in the memory 27. Thereafter, the procedure returns to step S1, and the subsequent processing is repeated.

Note that the first DB updating processing may be continuously executed when the imaging device 10 is turned on, and for example, the first DB updating processing may be executed at a predetermined timing in a predetermined period, for example, at one o'clock every day. Furthermore, the first DB updating processing may be executed in response to the operation of the user.

Figure 14:
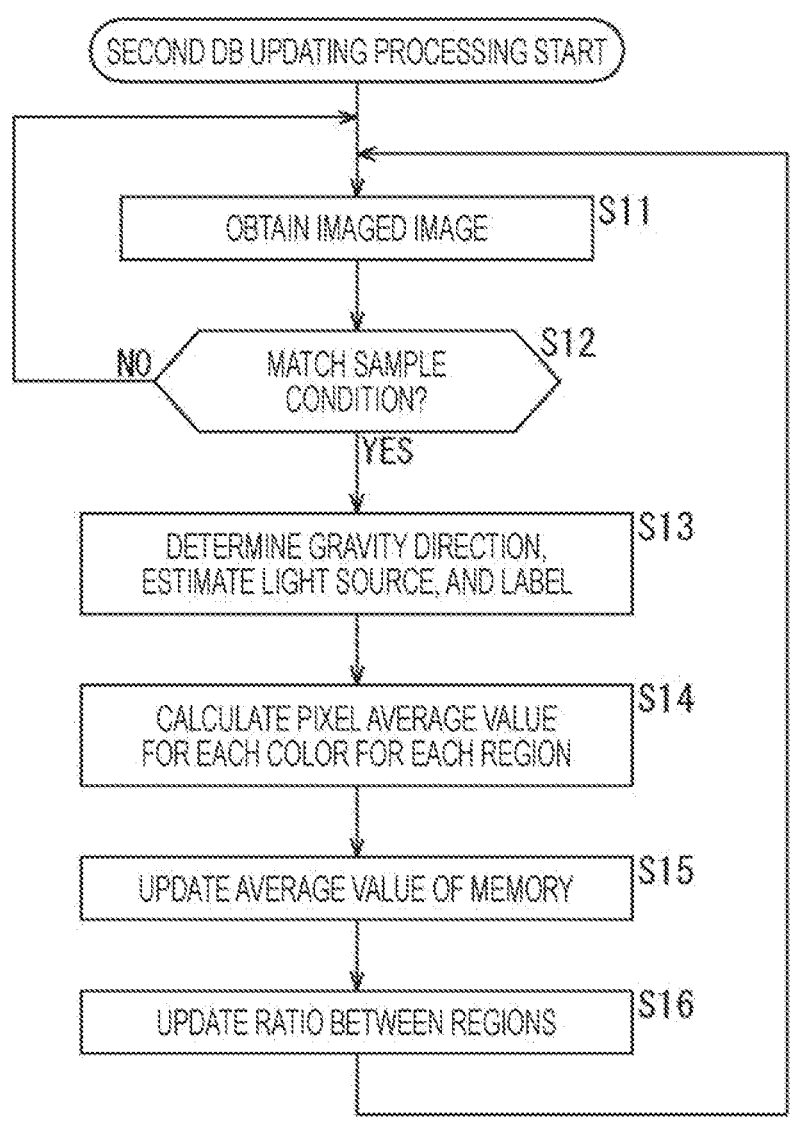
FIG. 14 is a flowchart for explaining second DB updating processing.

Next, FIG. 14 is a flowchart for explaining second DB updating processing. The second DB updating processing is executed to register and update information in the memory 27 of the DB unit 20 which is referred when the color shading correcting processing is executed.

In step S11, the image obtaining unit 21 obtains an image, to which the image processing is not executed, output from the imaging element 12 each time when an image is imaged and supplies the image to the sample condition determining unit 22. The sample condition determining unit 22 determines in step S12 whether or not the supplied image can be used as a sample image. In a case where it is determined that the image can be used as a sample image, the image obtaining unit 21 supplies the image to the label adding unit 23 as a sample image and proceeds the procedure to step S13. Conversely, in a case where it is determined that the image cannot be used as a sample image, the procedure returns to step S11.

In step S13, the label adding unit 23 determines the gravity direction in the sample image on the basis of the detection result of the sensor unit 18 and applies a label indicating the gravity direction to the image. Furthermore, the light source is estimated, and the label indicating the light source is applied.

Note that, for the processing in steps S11 to S13, the processing results of steps S1 to S3 in the first DB updating processing may be used.

In step S14, the pixel average value for each color calculating unit 25 divides the sample image into the plurality of regions, calculates an average value of each color component for each region, and outputs the value to the comparative analysis unit 26.

In step S15, each time when the average value of each color component of each region of the sample image is input from the pixel average value for each color calculating unit 25, the comparative analysis unit 26 reads the average value of each color component of each regions of the sample image and the number n of the sample images which are registered in the memory 27 for each of the labels indicating the gravity direction and the light source, recalculates the average value by using the input from the pixel average value for each color calculating unit 25, registers the number n+1 of the sample images obtained by incrementing the recalculated average value by one in the memory 27, and updates the number.

In step S16, the comparative analysis unit 26 calculates the ratio between the average values of each color component of the regions that are bilaterally symmetrical with respect to the gravity direction, that is, the regions at the center and on the left side and the regions at the center and on the right side, and registers the ratio in the memory 27. Thereafter, the procedure returns to step S11, and the subsequent processing is repeated.

Note that the second DB updating processing may be continuously executed when the imaging device 10 is turned on, and for example, the second DB updating processing may be executed at a predetermined timing in a predetermined period, for example, at one o'clock every day. Furthermore, the first DB updating processing may be executed in response to the operation of the user.

In addition, the first DB updating processing and the second DB updating processing may be concurrently executed in parallel and may be individually executed.

<Correcting Processing by Correcting Unit 30>

The correcting processing by the correcting unit 30 of the image processing unit 13 of the imaging device 10 will be described.

Figure 15:
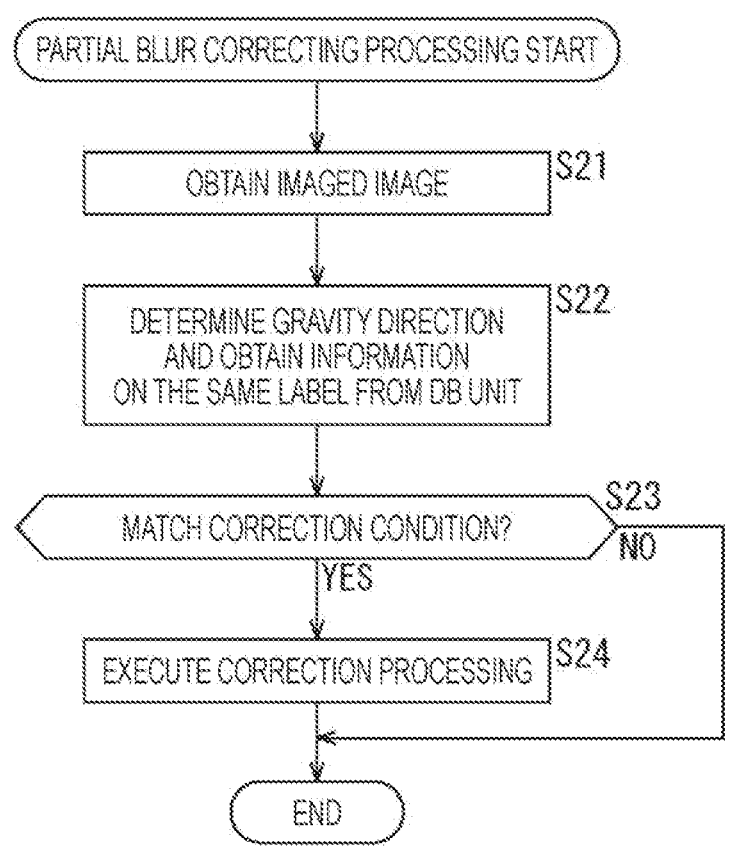
FIG. 15 is a flowchart for explaining partial blur correcting processing.

FIG. 15 is a flowchart for explaining the partial blur correcting processing by the resolution correcting unit 31 of the correcting unit 30.

In step S21, the resolution correcting unit 31 obtains an image, to which the image processing is not executed yet, output from the imaging element 12 each time when an image is imaged. In step S22, the resolution correcting unit 31 determines the gravity direction of the obtained image and obtains the number n of the sample images to which the label indicating the corresponding gravity direction is applied and the ratio between the average values of the power spectra of the regions that are bilaterally symmetrical with respect to the gravity direction from the memory 27 of the DB unit 20.

In step S23, the resolution correcting unit 31 determines whether or not the information obtained from the memory 27 of the DB unit 20 matches a correction condition. Specifically, only in a case where the number n of the sample images is equal to or more than a preset threshold $\alpha$ and the ratio between the average values of the power spectra of the regions that are bilaterally symmetrical with respect to the gravity direction exceeds a range of a predetermined threshold $\beta \pm 1.0$, the resolution correcting unit 31 determines that the information matches the correction condition.

In a case where it is determined in step S23 that the information matches the correction condition, the procedure proceeds to step S24. In step S24, the resolution correcting unit 31 executes resolution correction that is asymmetric with respect to the optical axis on the basis of the ratio between the average values of the power spectra of the regions that are bilaterally symmetrical with respect to the gravity direction. Specifically, a method for reflecting the ratio to a setting value of resolution restoring processing that can adjust a gain for each existing region, for example, processing described in Patent Document 1 on the basis of the ratio can be applied. Note that the resolution correcting unit 31 may calculate a resolution correction value on the basis of the ratio between the average values of the power spectra and execute the resolution correction that is asymmetric with respect to the optical axis on the basis of the calculated resolution correction value.

Note that, in a case where it is determined in step S23 that the information does not match the correction condition, step S24 is skipped. The description on the partial blur correcting processing is completed as described above.

Next, the peripheral resolution correcting processing by the resolution correcting unit 31 of the correcting unit 30 will be described. The peripheral resolution correcting processing can be similarly executed to the partial blur correcting processing described above. However, in the partial blur correcting processing, the ratio between the average values of the power spectra of the regions that are bilaterally symmetrical with respect to the gravity direction is referred. Whereas, in the peripheral resolution correcting processing, the ratio between the average values of the power spectra of the regions at the center and on the left side of the image and the regions at the center and on the right side is referred.

Then, only in a case where the number n of the sample images is equal to or more than the preset threshold $\alpha$ and the ratio is smaller than one, it is determined that the information matches the correction condition. Note that, in the peripheral resolution correction, the resolution correction that is asymmetric with respect to the optical axis is executed. Specifically, a method for reflecting the ratio to a setting value of resolution restoring processing that can adjust a gain for each existing region, for example, processing described in Patent Document 1 on the basis of the ratio can be applied.

Note that the threshold $\alpha$ relative to the number n of the sample images to be a condition of the partial blur correction and the threshold $\alpha$ relative to the number n of the sample images to be a condition of the peripheral resolution correction may be the same or different from each other.

Next, the color shading correcting processing by the shading resolution correcting unit 32 of the correcting unit 30 will be described. The color shading correcting processing can be similarly executed to the partial blur correcting processing described above. However, in the color shading correcting processing, the number n of the sample images to which the labels indicating the estimated gravity direction and light source are applied and the ratio between the average values of the same color component in the regions arranged in the direction orthogonal to the gravity direction (for example, regions CC and LC, regions CC and RC, and the like) are referred.

Then, only in a case where the number n of the sample images is equal to or more than a preset threshold $\alpha$ and the ratio of the average values of each color component in the regions arranged in the direction orthogonal to the gravity direction exceeds a range of a predetermined threshold $\gamma \pm 1.0$, it is determined that the information matches the correction condition, and the correction is made. Specifically, a gain that can adjust intensity asymmetrically with respect to the optical axis is set in a direction to cancel the ratio to correct the shading.

Note that the threshold $\alpha$ relative to the number n of the sample images in the color shading correcting processing may be set to be the same as or different from the value in a case of the partial blur correcting processing or a case of the peripheral resolution correcting processing.

<Modification>

Next, a modification of the imaging device 10 according to the present embodiment will be described.

As in a stereo camera system for measuring a distance, performing 3D imaging by using parallax, and the like, in a compound eye camera system using a plurality of imaging devices mounting the same optical lenses and the same imaging elements, it is desirable that the characteristics of the imaging devices coincide with each other.

Note that, although the same imaging devices have some differences in the characteristics, if each imaging device is individually adjusted, it is possible to coincide the characteristics with each other as a cost increases. However, even if the characteristics of the imaging devices coincide with each other at the time of shipment, in a case where a difference is made in the characteristics due to an accident after the shipment such as collision or dropping of the imaging devices, the difference cannot be corrected.

To overcome such a disadvantage, when the imaging device 10 according to the present embodiment is applied to the stereo camera system and the present technology is applied, the characteristics of in the plurality of imaging devices due to the accident after shipment can be coincided with each other.

Figure 16:
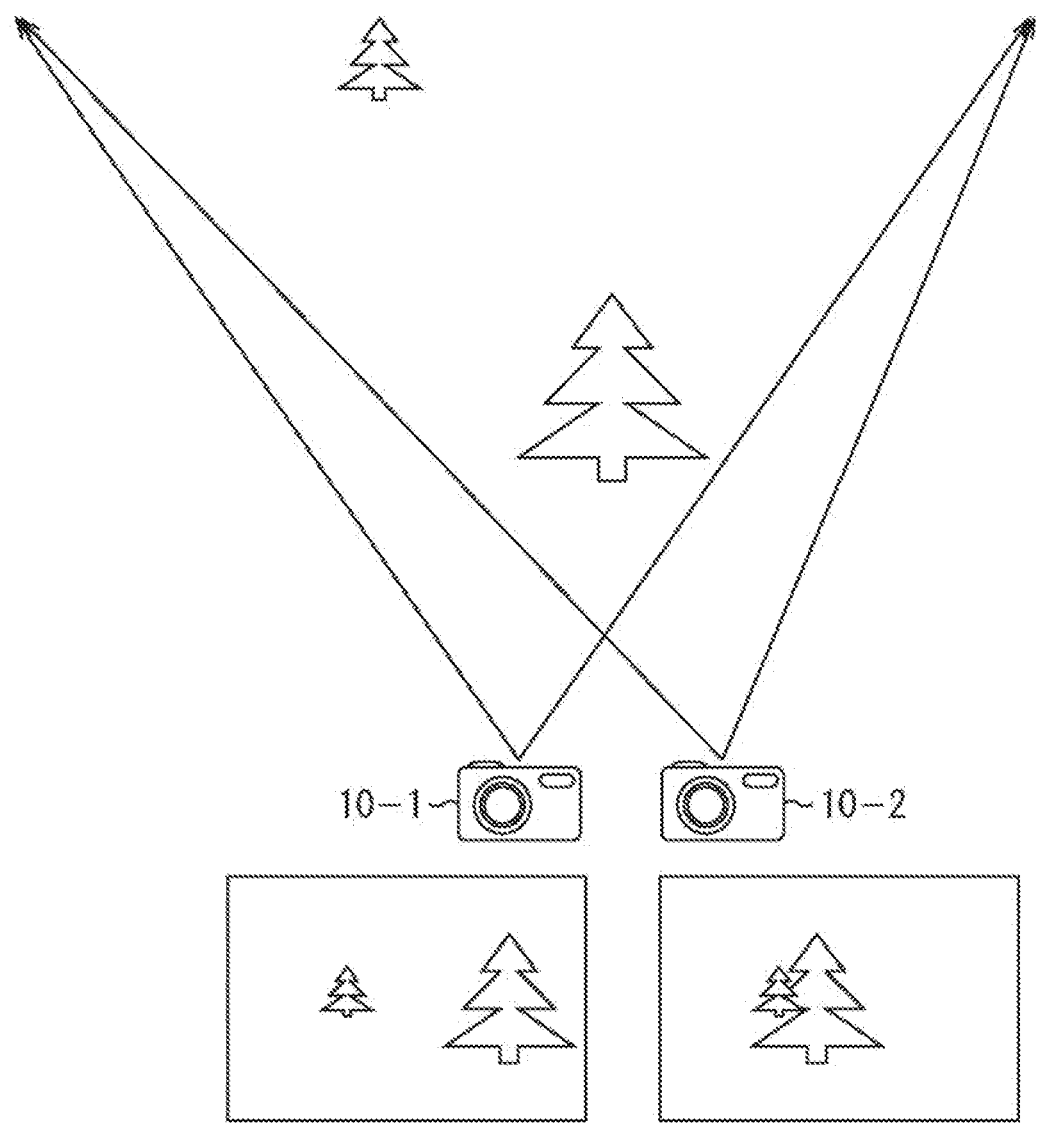
FIG. 16 is a diagram of an outline of a stereo camera system.

FIG. 16 illustrates an outline of a case where the imaging device 10 according to the present embodiment is employed in a stereo camera system. In a case of the stereo camera system, since imaging devices 10-1 and 10-2 have parallax, even when the imaging devices 10-1 and 10-2 image the same subject, images imaged by the imaging devices 10-1 and 10-2 are not completely the same. As the subject is closer to the imaging device 10, the difference between the images increases. Therefore, characteristics of the subject are canceled by using a large number of sample images, and the characteristics of the imaging devices 10-1 and 10-2 are compared.

Figure 17:
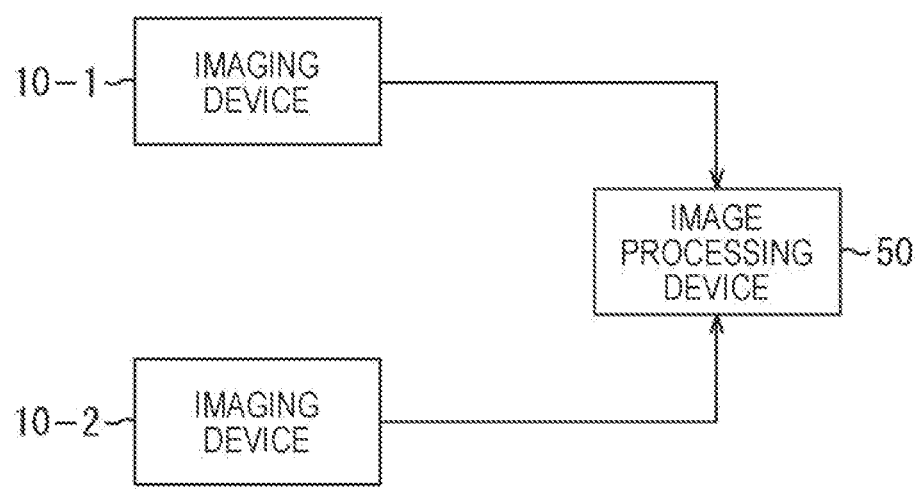
FIG. 17 is a block diagram of an exemplary configuration of a stereo camera system to which the present technology has been applied.

FIG. 17 illustrates an exemplary configuration of a stereo camera system which employs the imaging device 10 according to the present embodiment. The stereo camera system includes an image processing device 50 in addition to the imaging devices 10-1 and 10-2.

It is assumed that a configuration similar to the DB unit 20 and the correcting unit 30 illustrated in FIG. 2 be mounted in the image processing device 50. The images imaged by the imaging devices 10-1 and 10-2 are input to the image processing device 50. Predetermined image processing (including partial blur correcting processing, peripheral resolution correcting processing, and color shading correcting processing described above) may be executed on the input image.

<DB Updating Processing of Image Processing Device 50>

After labeling the image obtained from the imaging device 10-1, the image processing device 50 divides the image into a plurality of regions, calculates a power spectrum of each region, calculates an average value for each region, registers the average value in a memory (not shown), and updates the average value. Similarly, after labeling the image obtained from the imaging device 10-2, the image processing device 50 divides the image into a plurality of regions, calculates a power spectrum of each region, calculates an average value for each region, registers the average value in a memory, and updates the average value. In addition, a ratio between the average values of the power spectra in the regions at the same positions in the image from the imaging device 10-1 and the image from the imaging device 10-2 is calculated, is registered in the memory, and is updated.

FIG. 18 illustrates a case where a ratio between average values of power spectra in regions LH1 and LH2 and regions LL1 and LL2 as an example of the regions at the same positions in the image from the imaging device 10-1 and the image from the imaging device 10-2.

In a case where the number n of the sample images is sufficiently large, the ratio converges to one. Therefore, in a case where the ratio is different from one, it can be determined that the difference is derived from the difference between the characteristics of the imaging devices 10-1 and 10-2. Therefore, if the resolution correcting processing is executed in a direction to cancel the difference (normally, one with lower resolution is made to be closer to one with higher resolution), a resolution difference caused by the difference between the characteristics of the imaging devices 10-1 and 10-2 can be suppressed.

Figure 19:
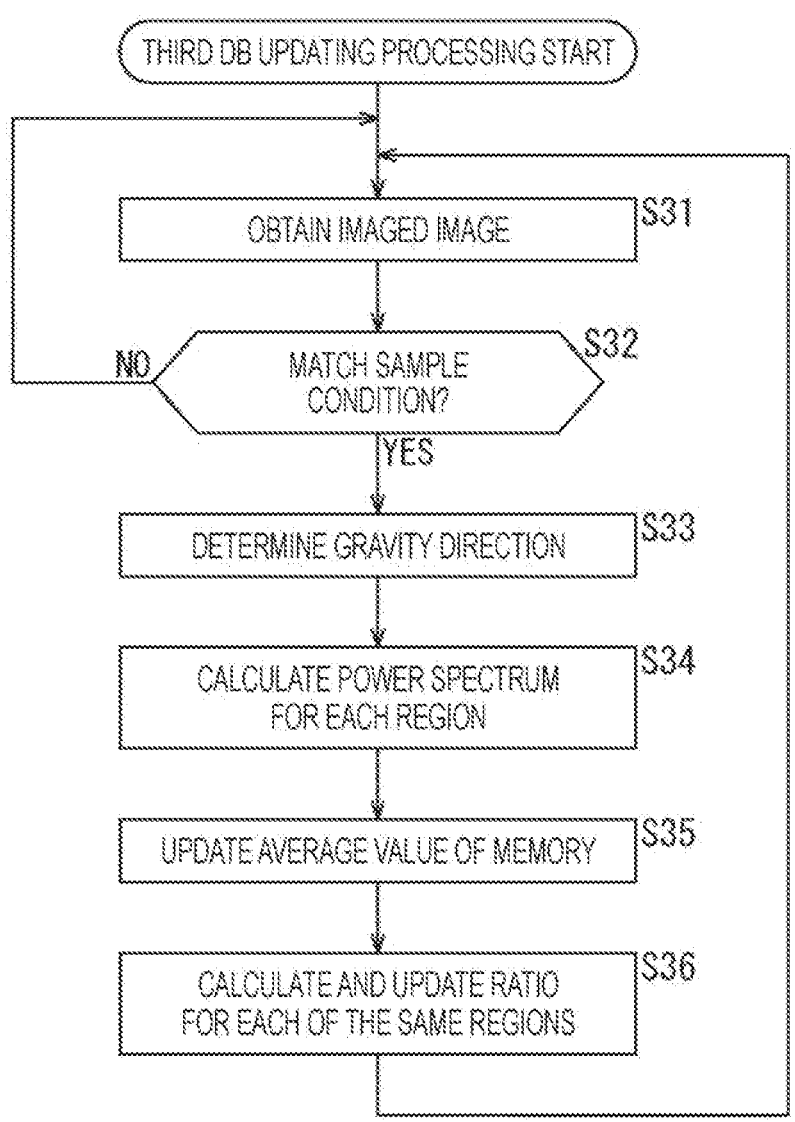
FIG. 19 is a flowchart for explaining the DB updating processing of the image processing device of the stereo camera system.

FIG. 19 is a flowchart for explaining DB updating processing by the image processing device 50. The DB updating processing is executed to register and update information which is referred when correcting processing for correcting the difference between the characteristics of the imaging devices 10-1 and 10-2 is executed.

In step S31, the image processing device 50 obtains images imaged by the imaging devices 10-1 and 10-2. In step S32, the image processing device 50 determines whether or not the obtained image can be used as a sample image. In a case where it is determined that the image can be used as a sample image, the image processing device 50 proceeds the procedure to step S33. Conversely, in a case where it is determined that the image cannot be used as a sample image, the procedure returns to step S31.

In step S33, the image processing device 50 determines the gravity direction in the sample image and applies a label which indicates the gravity direction and one of the imaging devices 10-1 or 10-2 with respect to the image.

In step S34, the image processing device 50 divides the sample image into a plurality of regions and calculates a power spectrum for each region. In step S35, the image processing device 50 reads the average value of the power spectrum in each region of the sample image and the number n of the sample images which are registered in the memory for each label, recalculates the average value by using the calculation result in step S34, registers the number n+1 of the sample images obtained by incrementing the recalculated average value by one in the memory, and updates the number.

In step S36, the image processing device 50 calculates a ratio between the average values of the power spectra in the regions at the same positions in the image from the imaging device 10-1 and the image from the imaging device 10-2, registers the ratio in the memory, and updates the ratio. Thereafter, the procedure returns to step S31, and the subsequent processing is repeated.

Note that the DB updating processing may be continuously executed when the imaging devices 10-1 and 10-2 image images, and for example, the DB updating processing may be executed at a predetermined timing in a predetermined period, for example, at one o'clock every day. Furthermore, the first DB updating processing may be executed in response to the operation of the user.

<Correcting Processing by Image Processing Device 50>

Next, correcting processing by the image processing device 50 will be described. The correcting processing can be similarly executed to the partial blur correcting processing. In other words, only in a case where the number n of the sample images is equal to or more than a preset threshold α and the ratio between the average values of the power spectra in the regions at the same positions in the image from the imaging device 10-1 and the image from the imaging device 10-2 exceeds a range of a predetermined threshold β±1.0, it is determined that the information matches the correction condition, and resolution correction processing is executed.

Specifically, the resolution correction processing is executed so that one with lower resolution is made to be closer to one with higher resolution in a direction to cancel the difference (conversely, one with higher resolution may be closer to one with lower resolution). With this processing, a resolution difference caused by the difference between the characteristics of the imaging devices 10-1 and 10-2 can be suppressed.

Note that, without limiting to the stereo camera system using two imaging devices 10, the DB updating processing and the correcting processing by the image processing device 50 described above can be applied to a system using equal to or more than three imaging devices 10.

<Summary>

According to the present embodiment, processes from a manufacturing process to an individual adjustment process can be omitted, a manufacturing cost can be reduced in comparison with a case where the individual adjustment process is executed.

Furthermore, it is possible to correct image quality deterioration such as a partial blur caused by an accident such as dropping occurred after shipment.

In addition, according to the present embodiment, since a DB is constructed corresponding to each of different light sources, accuracy of the color shading correcting processing can be improved.

However, in the present embodiment, the effect described above can be obtained by constructing the DB by imaging the sufficient number of sample images. Therefore, in particular, the present embodiment is suitable for an imaging device such as a wearable camera which images a large number of images and records a life log even when a user does not intentionally execute an imaging operation and a camera used for machine vision including a drive recorder and the like.

Other Application Examples

The technology according to the present disclosure can be applied to various products. For example, the technology according to the present disclosure is realized as an apparatus to be mounted on any type of mobile body such as a car, an electric vehicle, a hybrid electric vehicle, a motorcycle, a bicycle, a personal mobility, an airplane, a drone, a ship, and a robot, a construction machine, and an agricultural machine (tractor).

Figure 20:
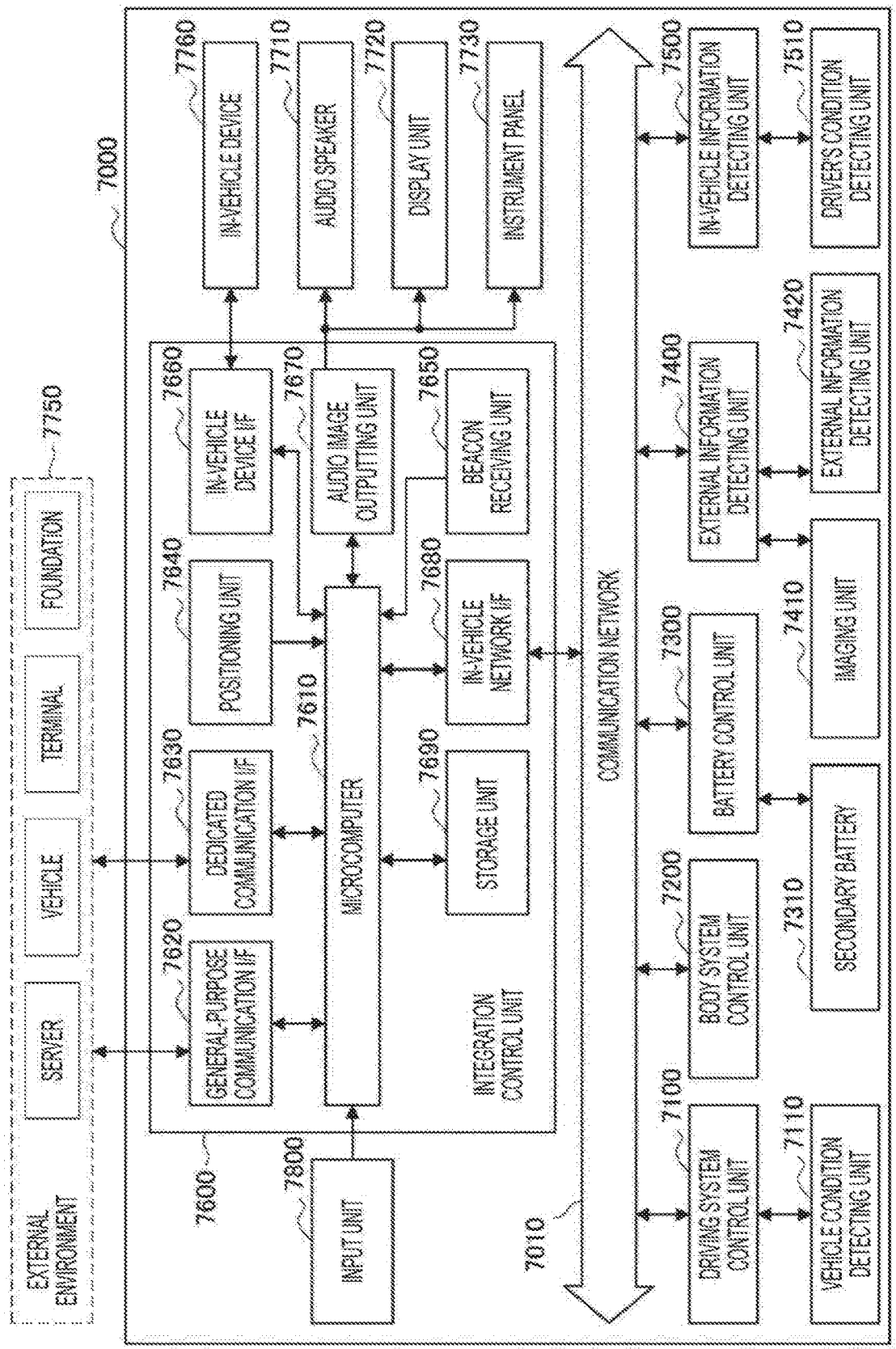
FIG. 20 is a block diagram of an exemplary schematic configuration of a vehicle control system.

FIG. 20 is a block diagram of an exemplary schematic configuration of a vehicle control system 7000 which is an example of a mobile body control system to which the technology according to the present disclosure may be applied. The vehicle control system 7000 includes a plurality of electronic control units connected via a communication network 7010. In the example illustrated in FIG. 20, the vehicle control system 7000 includes a driving system control unit 7100, a body system controlling unit 7200, a battery control unit 7300, an external information detecting unit 7400, an in-vehicle information detecting unit 7500, and an integration control unit 7600. The communication network 7010 for connecting the plurality of control units may be an in-vehicle communication network compliant with an optional standard, for example, the Controller Area Network (CAN), Local Interconnect Network (LIN), the Local Area Network (LAN), the FlexRay (registered trademark), or the like.

Each control unit includes a microcomputer which performs operation processing in accordance with various programs, a storage unit which stores the program executed by the microcomputer or a parameter or the like used for various operations, and a driving circuit which drives devices to be controlled. Each control unit includes a network I/F to communicate with other control unit via the communication network 7010 and a communication I/F to communicate by wired or wireless communication with devices inside/outside the vehicle, a sensor, or the like. In FIG. 20, as functional configurations of the integration control unit 7600, a microcomputer 7610, a general-purpose communication I/F 7620, a dedicated communication I/F 7630, a positioning unit 7640, a beacon receiving unit 7650, an in-vehicle device I/F 7660, an audio image outputting unit 7670, an in-vehicle network I/F 7680, and a storage unit 7690 are illustrated. Other control unit similarly includes a microcomputer, a communication I/F, a storage unit, and the like.

The driving system control unit 7100 controls an operation of a device relating to a driving system of the vehicle in accordance with various programs. For example, the driving system control unit 7100 functions as a control device of a device such as a driving force generating device to generate a driving force of the vehicle such as an internal combustion engine or a driving motor, a driving force transmitting mechanism to transmit the driving force to wheels, a steering mechanism which adjusts a steering angle of the vehicle, and a braking device which generates a braking force of the vehicle. The driving system control unit 7100 may have a function as a control device such as an antilock brake system (ABS) or an electronic stability control (ESC).

The driving system control unit 7100 is connected to a vehicle condition detecting unit 7110. The vehicle condition detecting unit 7110 includes at least one of, for example, a gyro sensor which detects an angular velocity of a shaft rotary motion of a vehicle body, an acceleration sensor which detects an acceleration of the vehicle, and sensors to detect an operation amount of an accelerator pedal, an operation amount of a brake pedal, a steering angle of a steering wheel, an engine speed, a rotational speed of a wheel, or the like. The driving system control unit 7100 performs operation processing by using the signal input from the vehicle condition detecting unit 7110 and controls an internal combustion engine, a driving motor, an electric power steering device, a brake device, or the like.

The body system controlling unit 7200 controls operations of various devices attached to the vehicle body in accordance with various programs. For example, the body system controlling unit 7200 functions as a control device of a keyless entry system, a smart key system, a power window device, or various lamps such as a head lamp, a back lamp, a brake lamp, a direction indicator, or a fog lamp. In this case, a radio wave transmitted from a portable machine for substituting a key or signals of various switches may be input to the body system controlling unit 7200. The body system controlling unit 7200 receives the input of the radio wave or the signal and controls a door locking device, the power window device, the lamp, and the like of the vehicle.

The battery control unit 7300 controls a secondary battery 7310 which is a power supply source of the driving motor according to various programs. For example, a battery device including the secondary battery 7310 inputs information such as a battery temperature, a battery output voltage, or a residual capacity of the battery, to the battery control unit 7300. The battery control unit 7300 performs operation processing by using these signals and controls temperature regulation of the secondary battery 7310 or controls a cooling device included in the battery device and the like.

The external information detecting unit 7400 detects external information of the vehicle including the vehicle control system 7000. For example, the external information detecting unit 7400 is connected to at least one of an imaging unit 7410 or an external information detecting section 7420. The imaging unit 7410 includes at least one of a time of flight (ToF) camera, a stereo camera, a monocular camera, an infrared camera, or other camera. The external information detecting section 7420 includes, for example, at least one of an environment sensor to detect current whether or meteorological phenomenon or a surrounding information detecting sensor to detect other vehicle, an obstacle, a pedestrian around the vehicle, or the like, including the vehicle control system 7000.

The environment sensor may be, for example, at least one of a raindrop sensor which detects rainy weather, a fog sensor which detects fog, a sunshine sensor which detects a sunshine degree, or a snow sensor which detects snow fall. The surrounding information detecting sensor may be at least one of an ultrasonic sensor, a radar apparatus, and a light detection and ranging, laser imaging detection or ranging (LIDAR) device. The imaging unit 7410 and the external information detecting section 7420 may be included as independent sensors and devices and may be a device formed by integrating a plurality of sensors and devices.

Figure 21:
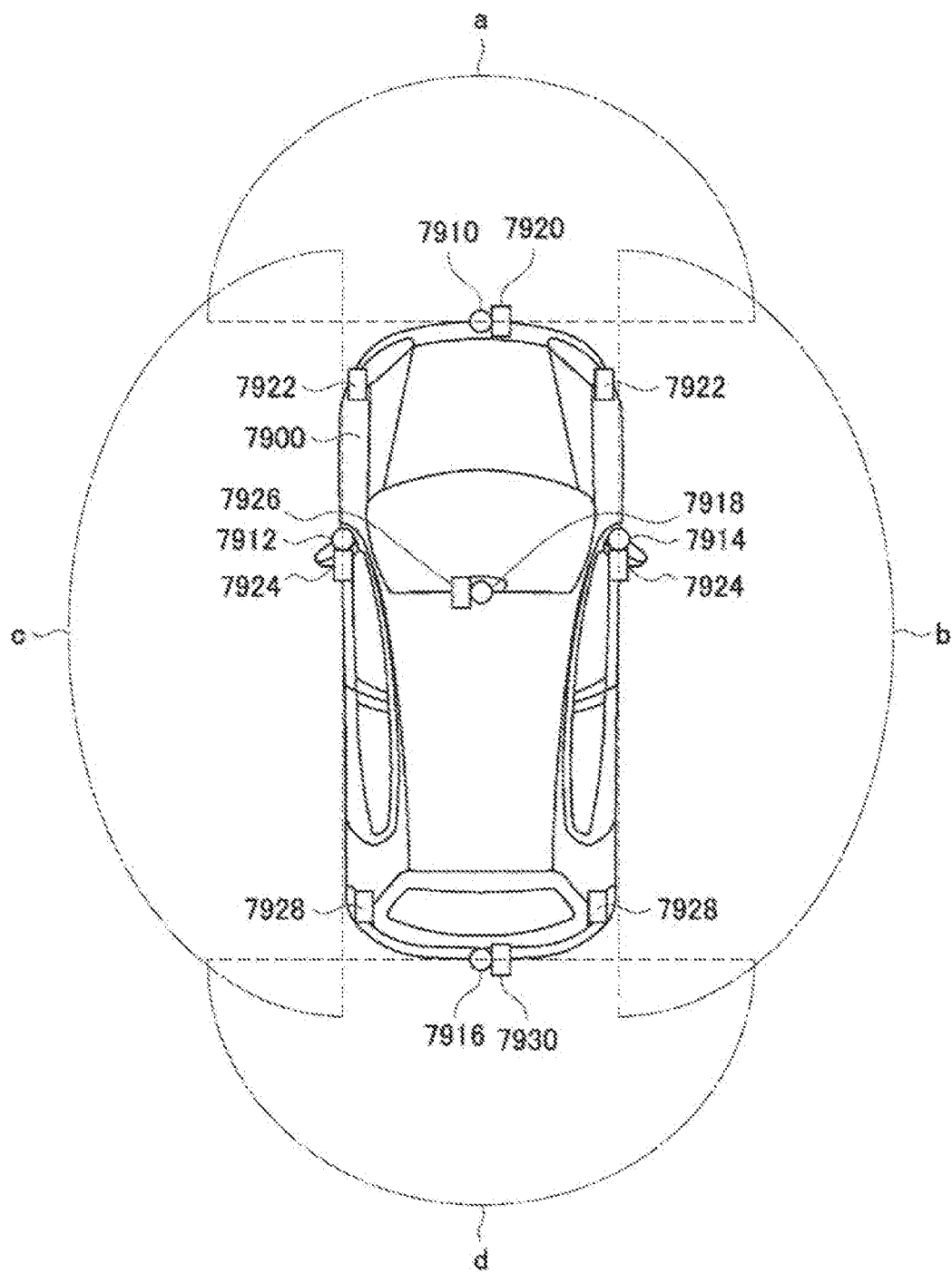
FIG. 21 is an explanatory diagram of exemplary set positions of an external information detecting unit and imaging units.

Here, in FIG. 21, an example of set positions of the imaging unit 7410 and the external information detecting section 7420 is illustrated. Each of the imaging units 7910, 7912, 7914, 7916, and 7918 are provided in at least one of, for example, a front nose, a side mirror, a rear bumper, a back door, or an upper side of a windshield in the vehicle interior of the vehicle 7900. The imaging unit 7910 provided in the front nose and the imaging unit 7918 provided on the upper side of the windshield in the vehicle interior mainly obtain images on front side of the vehicle 7900. The imaging units 7912 and 7914 provided in the side mirrors mainly obtain images on the sides of the vehicle 7900. The imaging unit 7916 provided in the rear bumper or the back door mainly obtains an image on the back side of the vehicle 7900. The imaging unit 7918 provided on the upper side of the windshield in the vehicle interior is mainly used to detect a preceding vehicle, a pedestrian, an obstacle, a traffic light, a traffic sign, a traffic lane, or the like.

Note that, in FIG. 21, exemplary photographing ranges of the respective imaging units 7910, 7912, 7914, and 7916 are illustrated. An imaging range a indicates an imaging range of the imaging unit 7910 provided in the front nose, and imaging ranges b and c respectively indicate imaging ranges of the imaging units 7912 and 7914 provided in the side mirrors. An imaging range d indicates an imaging range of the imaging unit 7916 provided in the rear bumper or the back door. For example, image data imaged by the imaging units 7910, 7912, 7914, and 7916 is superposed so that a bird's-eye image of the vehicle 7900 viewed from above can be obtained.

External information detecting units 7920, 7922, 7924, 7926, 7928, and 7930 respectively provided on the front, rear, side, corner, and upper side of the windshield of the vehicle interior of the vehicle 7900 may be, for example, ultrasonic sensors or radar apparatuses. The external information detecting units 7920, 7926, and 7930 provided in the front nose, the rear bumper, the back door, and the upper side of the windshield in the vehicle interior of the vehicle 7900 may be, for example, LIDAR devices. The external information detecting units 7920 to 7930 are mainly used to detect a preceding vehicle, a pedestrian, an obstacle, or the like.

Description is continued with reference to the FIG. 20 again. The external information detecting unit 7400 makes the imaging unit 7410 image an image outside the vehicle and receives the imaged image data. Furthermore, the external information detecting unit 7400 receives detection information from the external information detecting section 7420 connected to the external information detecting unit 7400. In a case where the external information detecting section 7420 is an ultrasonic sensor, a radar apparatus, or a LIDAR device, the external information detecting unit 7400 makes the external information detecting section 7420 transmit ultrasonic waves, radio waves, or the like and receives information regarding the received reflected waves. The external information detecting unit 7400 may execute processing for detecting an object such as a person, a car, an obstacle, a sign, or letters on the road or distance detection processing on the basis of the received information. The external information detecting unit 7400 may execute environment recognition processing for recognizing rain, fog, a road surface condition, or the like on the basis of the received information. The external information detecting unit 7400 may calculate a distance to an object outside the vehicle on the basis of the received information.

Furthermore, the external information detecting unit 7400 may execute image recognition processing for recognizing a person, a car, an obstacle, a sign, letters on the road, or the like or the distance recognition processing on the basis of the received image data. The external information detecting unit 7400 may generate a bird's-eye image or a panoramic image by executing processing such as distortion correction or positioning to the received image data and synthesizing the image data imaged by the different imaging units 7410. The external information detecting unit 7400 may execute viewpoint conversion processing by using the image data imaged by the different imaging units 7410.

The in-vehicle information detecting unit 7500 detects in-vehicle information. The in-vehicle information detecting unit 7500 is connected to, for example, a driver's condition detecting unit 7510 for detecting a condition of a driver. The driver's condition detecting unit 7510 may include a camera for imaging the driver, a biosensor for detecting biological information of the driver, a microphone for collecting sound in the vehicle interior, or the like. The biosensor is provided, for example, in a seat surface, a steering wheel, or the like and detects biological information of an occupant who sits on the seat or a driver who holds a steering wheel. On the basis of the detection information input from the driver's condition detecting unit 7510, the in-vehicle information detecting unit 7500 may calculate a fatigue degree or a concentration degree of the driver and may determine whether or not the driver falls asleep. The in-vehicle information detecting unit 7500 may execute processing such as noise canceling processing to the collected audio signal.

The integration control unit 7600 controls a whole operation in the vehicle control system 7000 according to various programs. The integration control unit 7600 is connected to an input unit 7800. The input unit 7800 is realized by a device, to which the occupant can perform an input operation, such as a touch panel, a button, a microphone, a switch, or a lever. The integration control unit 7600 may receive data obtained by recognizing sound input by a microphone. The input unit 7800 may be, for example, a remote control device using infrared rays or other radio waves and may be an external connection device such as a mobile phone or a personal digital assistant (PDA) corresponding to the operation of the vehicle control system 7000. The input unit 7800 may be, for example, a camera. In this case, the occupant can input information by using a gesture. Alternatively, data obtained by detecting a movement of a wearable device worn by an occupant may be input. In addition, the input unit 7800 may include, for example, an input control circuit or the like which generates an input signal on the basis of the information input by the occupant and the like by using the input unit 7800 and outputs the input signal to the integration control unit 7600. The occupant and the like input various data and instruct a processing operation to the vehicle control system 7000 by operating the input unit 7800.

The storage unit 7690 may include a Read Only Memory (ROM) for storing various programs executed by a microcomputer and a Random Access Memory (RAM) for storing various parameters, calculation results, a sensor value, or the like. Furthermore, the storage unit 7690 may be realized by a magnetic storage device such as a Hard Disc Drive (HDD), a semiconductor storage device, an optical storage device, a magneto-optical storage device, or the like.

The general-purpose communication I/F 7620 mediates general communication with various devices existing in an external environment 7750. The general-purpose communication I/F 7620 may implement a cellular communication protocol such as the Global System of Mobile communications (GSM), the WiMAX, the Long Term Evolution (LTE), or the LTE-Advanced (LTE-A) or other wireless communication protocol such as wireless LANs (Wi-Fi (registered trademark)) and the Bluetooth (registered trademark). For example, the general-purpose communication I/F 7620 may be connected to a device (for example, application server or control server) existing on an external network (for example, internet, cloud network, or company-specific network) via a base station or an access point. Furthermore, the general-purpose communication I/F 7620 may be connected to a terminal existing near the vehicle (for example, terminal of driver, pedestrian, or shop or machine type communication (MTC) terminal), for example, by using the peer to peer (P2P) technology.

The dedicated communication I/F 7630 supports a communication protocol established to be used for the vehicle. The dedicated communication I/F 7630 may, for example, implement a standard protocol such as the Wireless Access in Vehicle Environment (WAVE) which is a combination of the IEEE 802.11p of a lower layer and the IEEE 1609 of an upper layer, the Dedicated Short Range Communications (DSRC), or a cellular communication protocol. The dedicated communication I/F 7630 typically performs V2X communication which is a concept including one or more of vehicle to vehicle communication, vehicle to infrastructure communication, vehicle to home communication, and vehicle to pedestrian communication.

For example, the positioning unit 7640 receives a GNSS signal (for example, GPS signal from global positioning system (GPS) satellite) from a global navigation satellite system (GNSS) satellite and executes positioning. Then, the positioning unit 7640 generates position information including a latitude, a longitude, and a height of the vehicle. Note that the positioning unit 7640 may specify the current position by exchanging a signal with a wireless access point or may obtain the position information from a terminal such as a mobile phone, a PHS, or a smartphone having a positioning function.

The beacon receiving unit 7650, for example, receives radio waves or electromagnetic waves transmitted from a wireless station installed on the road or the like and obtains information including the current position, traffic congestion, a closed area, a required time, or the like. Note that the function of the beacon receiving unit 7650 may be included in the dedicated communication I/F 7630 described above.

The in-vehicle device I/F 7660 is a communication interface for mediating connection between the microcomputer 7610 and various in-vehicle devices 7760 in the vehicle. The in-vehicle device I/F 7660 may establish wireless connection by using a wireless communication protocol such as a wireless LAN, the Bluetooth (registered trademark), Near Field Communication (NFC), or a wireless USB (WUSB). Furthermore, the in-vehicle device I/F 7660 may establish wired connection to a Universal Serial Bus (USB), a High-Definition Multimedia Interface (HDMI), a Mobile High-definition Link (MHL), or the like via a connection terminal (and cable as necessary) which is not shown. The in-vehicle device 7760 may include, for example, at least one of a mobile device or a wearable device owned by the occupant, or an information device carried in or attached to the vehicle. Furthermore, the in-vehicle device 7760 may include a navigation device which searches a route to an arbitrary destination. The in-vehicle device I/F 7660 exchanges a control signal or a data signal with the in-vehicle device 7760.

The in-vehicle network I/F 7680 is an interface for mediating the communication between the microcomputer 7610 and the communication network 7010. The in-vehicle network I/F 7680 transmits and receives a signal and the like in accordance with a predetermined protocol supported by the communication network 7010.

The microcomputer 7610 of the integration control unit 7600 controls the vehicle control system 7000 according to various programs on the basis of information obtained via at least one of the general-purpose communication I/F 7620, the dedicated communication I/F 7630, the positioning unit 7640, the beacon receiving unit 7650, the in-vehicle device I/F 7660, or the in-vehicle network I/F 7680. For example, the microcomputer 7610 may calculate a control target value of a driving force generating device, a steering mechanism, or a braking device on the basis of the obtained information inside and outside the vehicle and output a control instruction to the driving system control unit 7100. For example, the microcomputer 7610 may perform cooperative control to realize a function of an Advanced Driver Assistance System (ADAS) including collision avoidance or impact relaxation of the vehicle, a following travel based on a distance between vehicles, a vehicle speed maintaining travel, a vehicle collision warning, a lane deviation warning of the vehicle, or the like. Furthermore, the microcomputer 7610 controls the driving force generating device, the steering mechanism, the braking device, or the like on the basis of the obtained information regarding the surroundings of the vehicle so as to perform cooperative control for automatic drive in which the vehicle autonomously travels without depending on an operation by the driver and the like.

The microcomputer 7610 may generate three-dimensional distance information between the vehicle and an object such as a building and a person around the vehicle and create local map information including peripheral information of the current position of the vehicle on the basis of the information obtained via at least one of the general-purpose communication I/F 7620, the dedicated communication I/F 7630, the positioning unit 7640, the beacon receiving unit 7650, the in-vehicle device I/F 7660, or the in-vehicle network I/F 7680. Furthermore, the microcomputer 7610 may predict a danger such as a collision of the vehicle, approach of a pedestrian or the like, or entry to the closed road on the basis of the obtained information and generate a warning signal. The warning signal may be, for example, a signal to generate warning sound or to light a warning lamp.

The audio image outputting unit 7670 transmits an output signal which is at least one of a voice or an image to an output device which can visually or auditorily notify information of the occupant of the vehicle or the outside the vehicle. In the example in FIG. 20, an audio speaker 7710, a display unit 7720, and an instrument panel 7730 are exemplified as the output device. The display unit 7720 may include, for example, at least one of an on-board display or a head-up display. The display unit 7720 may have an augmented reality (AR) display function. The output device may be a device other than the above devices, such as a wearable device such as a headphone, a glass-type display worn by the occupant, a projector, or a lamp. In a case where the output device is a display device, the display device visually displays the result obtained by various processing executed by the microcomputer 7610 or information received from the other control unit in various formats such as a text, an image, a chart, and a graph. Furthermore, in a case where the output device is a sound output device, the sound output device converts an audio signal including reproduced audio data, acoustic data, or the like into an analog signal and auditorily outputs the signal.

Note that, in the example illustrated in FIG. 20, at least two control units connected via the communication network 7010 may be integrated as a single control unit. Alternatively, each control unit may include a plurality of control units. In addition, the vehicle control system 7000 may include other control unit which is not shown. Furthermore, in the above description, other control unit may have a part of or all of the function of any one of controls units. That is, if information can be transmitted and received via the communication network 7010, any one of the control units may execute predetermined operation processing. Similarly, a sensor or a device connected to any one of the control units may be connected to the other control unit, and the plurality of control units may transmit and receive detection information to/from each other via the communication network 7010.

Note that a computer program to realize each function of the DB unit 20 and the correcting unit 30 according to the present embodiment described with reference to FIG. 2 can be mounted to any one of control unit and the like. Furthermore, a computer-readable recording medium storing such a computer program can be provided. The recording medium is, for example, a magnetic disk, an optical disk, a magneto-optical disk, a flash memory, and the like. Furthermore, the computer program may be distributed, for example, via a network, without using the recording medium.

Furthermore, the embodiment of the present technology is not limited to the above-mentioned embodiments, and various changes can be made without departing from the scope of the present technology.

The present technology may have a configuration below.

(1)

An image processing device including:

a quantitative value calculating unit configured to calculate a quantitative value of a sample image based on an obtained image;

an average value calculating unit configured to calculate an average value of the quantitative values calculated from a plurality of the sample images;

a holding unit configured to hold the calculated average value of the quantitative values; and a correcting unit configured to correct an imaged image on the basis of the held average value of the quantitative values.

(2)

The image processing device according to (1), in which the quantitative value calculating unit divides the sample image into a plurality of regions and calculates the quantitative value for each region, and the average value calculating unit calculates an average value of the quantitative values calculated for each region of a plurality of the sample images.

(3)

The image processing device according to (1), in which the correcting unit calculates an image correction value on the basis of the average value and corrects an imaged image on the basis of the calculated image correction value.

(4)

The image processing device according to (1) or (2), in which the average value calculating unit further calculates a ratio between the average values of the quantitative values of different regions, the holding unit further holds the ratio between the average values of the quantitative values of the different regions, and the correcting unit corrects the imaged image according to the held ratio between the average values of the quantitative values of the different regions.

(5)

The image processing device according to (1) or (2), in which the quantitative value calculating unit calculates a power spectrum as a quantitative value of the sample image, and the correcting unit corrects an imaged image on the basis of the average value of the power spectrum as the held quantitative value.

(6)

The image processing device according to (5), in which the correcting unit corrects a resolution of an imaged image.

(7)

The image processing device according to (5) or (6), in which the average value calculating unit calculates a ratio between the average values of the power spectra of regions which are horizontally arranged with respect to a gravity direction of the sample image, and the correcting unit corrects a partial blur of an imaged image according to the held ratio between the average values of the power spectra of the regions which are horizontally arranged with respect to the gravity direction of the sample image.

(8)

The image processing device according to (5) or (6), in which the average value calculating unit calculates a ratio between the average values of the power spectra of a center region and a peripheral region of the sample image, and the correcting unit corrects a resolution of a peripheral region of an imaged image according to the held ratio between the average values of the power spectra of the center region and the peripheral region of the sample image.

(9)

The image processing device according to (1) or (2), in which the quantitative value calculating unit calculates a pixel value of each color component as the quantitative value of the sample image, and the correcting unit corrects color shading of an imaged image on the basis of an average value of the held pixel value of each color component as the quantitative value.

(10)

The image processing device according to (9), in which the average value calculating unit calculates a ratio between the average values of the pixel values of each color component in respective regions which are arranged in a direction orthogonal to a gravity direction of the sample image, and the correcting unit corrects color shading of an imaged image according to the held ratio between the average values of the pixel values of each color component of respective regions which are arranged in the direction orthogonal to the gravity direction of the sample image.

(11)

The image processing device according to any one of (1) to (10), in which the correcting unit corrects an imaged image on the basis of the average value of the held quantitative values after the number of sample images becomes equal to or more than a threshold.

(12)

The image processing device according to any one of (1) to (11), further including:

a selection unit configured to select the sample image from the obtained images.

(13)

The image processing device according to (12), in which the selection unit selects the sample image by removing an image imaged with an ISO value higher than a predetermined ISO value, an image imaged with an exposure value higher or lower than a predetermined exposure value, and consecutively shot images from among the obtained images.

(14)

The image processing device according to (1), in which the holding unit holds the calculated average value of the quantitative values in association with a component of an imaging unit used for imaging the sample image.

(15)

The image processing device according to (14), further including:

the imaging unit including an optical lens and an imaging element which generates a pixel signal in accordance with incident light collected by the optical lens.

(16)

The image processing device according to (5), in which the average value calculating unit calculates a ratio between the average values of the power spectra of the regions at the same positions in the sample images respectively imaged by a plurality of different imaging devices, and the correcting unit corrects resolutions of the images imaged by the plurality of different imaging devices according to the held ratio between the average values of the power spectra of the regions at the same positions in the sample images respectively imaged by the plurality of different imaging devices.

(17)

The image processing device according to (16), in which the holding unit holds the average value of the quantitative values which is calculated in association with an imaging device used for imaging the sample image.

(18)

An image processing method of an image processing device executed by the image processing device, the method including:

a quantitative value calculating step of calculating a quantitative value of a sample image based on an obtained image;

an average value calculating step of calculating an average value of the quantitative values calculated from a plurality of the sample images;

a holding step of holding the calculated average value of the quantitative values; and a correcting step of correcting an imaged image on the basis of the held average value of the quantitative values.

(19)

An imaging device including:

an optical lens;

an imaging element configured to generate a pixel signal in accordance with incident light collected by the optical lens;

an obtaining unit configured to obtain an image including the pixel signal;

a quantitative value calculating unit configured to calculate a quantitative value of a sample image based on the obtained image;

an average value calculating unit configured to calculate an average value of the quantitative values calculated from a plurality of the sample images;

a holding unit configured to hold the calculated average value of the quantitative values; and a correcting unit configured to correct an imaged image on the basis of the held average value of the quantitative values.

(20)

The imaging device according to (19), in which at least one of the optical lens or the imaging element is detachable and exchangeable.

REFERENCE SIGNS LIST

10 imaging device
11 optical lens
12 imaging element
13 Image processing unit
14 display unit
15 recording unit
16 operation unit
17 imaging control unit
18 sensor unit
20 DB unit
21 image obtaining unit
22 sample condition determining unit
23 gravity determining unit
24 frequency characteristics calculating unit
25 pixel average value for each color calculating unit
26 comparative analysis unit
27 memory
30 correcting unit
31 resolution correcting unit
32 shading correcting unit
50 image processing device

The invention claimed is:

1. An image processing device, comprising:
a central processing unit (CPU) configured to:
  obtain a plurality of images;
  determine a first set of sample images from the obtained plurality of images;
  divide a first sample image of the first set of sample images into a plurality of regions, wherein the plurality of regions includes a first region and a second region;
  calculate a quantitative value of each region of the plurality of regions of the first sample image;
  calculate a first average value of a first plurality of quantitative values, wherein
    the first plurality of quantitative values includes the quantitative value of the first region of the first sample image, and
    each quantitative value of the first plurality of quantitative values corresponds to a respective first region of a respective sample image in the first set of sample images;
  calculate a second average value of a second plurality of quantitative values, wherein
    the second plurality of quantitative values includes the quantitative value of the second region of the first sample image, and
    each quantitative value of the second plurality of quantitative values corresponds to a respective second region of the respective sample image in the first set of sample images;
  calculate a ratio between the first average value and the second average value;
  control a memory to store the ratio between the first average value and the second average value; and
  correct an imaged image based on the stored ratio between the first average value and the second average value.

2. The image processing device according to claim 1, wherein the CPU is further configured to:
calculate an image correction value based on the first average value and the second average value; and
correct the imaged image based on the calculated image correction value.

3. The image processing device according to claim 1, wherein the CPU is further configured to
calculate a power spectrum as the quantitative value of each region of the plurality of regions of the first sample image.

4. The image processing device according to claim 3, wherein the CPU is further configured to correct a resolution of the imaged image.

5. The image processing device according to claim 3, wherein
the first average value is an average value of the power spectrum of the respective first region of the respective sample image in the first set of sample images,
the second average value is an average value of the power spectrum of the respective second region of the respective sample image in the first set of sample images,
the first region of the first sample image and the second region of the first sample image are horizontal with respect to a gravity direction of the first sample image, and
the CPU is further configured to correct a partial blur of the imaged image based on the stored ratio between the first average value and the second average value.

6. The image processing device according to claim 3, wherein
the first average value is an average value of the power spectrum of a center region of each sample image in the first set of sample images,
the second average value is an average value of the power spectrum of a peripheral region of each sample image in the first set of sample images,
and
the CPU is further configured to correct a resolution of a peripheral region of the imaged image based on the stored ratio between the first average value and the second average value.

7. The image processing device according to claim 1, wherein the CPU is further configured to:
calculate a pixel value of each color component of each region of the plurality of regions of the first sample image;
calculate a third average value of a plurality of pixel values, wherein
the plurality of pixel values includes the pixel value of the each color component of the each region of the first sample image, and
each pixel value of the plurality of pixel values corresponds to a color component of a respective region of the respective sample image in the first set of sample images;
control the memory to store the third average value; and
correct a color shade of the imaged image based on the stored third average value.

8. The image processing device according to claim 7, wherein the CPU is further configured to:
calculate a fourth average value of a first set of pixel values, wherein
each pixel value of the first set of pixel values corresponds to the color component of a respective third region of the respective sample image in the first set of sample images;
calculate a fifth average value of a second set of pixel values, wherein
each pixel value of the second set of pixel values corresponds to the color component of a respective fourth region of the respective sample image in the first set of sample images, and
each of the respective third region of the respective sample image and the respective fourth region of the respective sample image is orthogonal to a gravity direction of the first sample image;
calculate a ratio between the fourth average value and the fifth average value;
control the memory to store the ratio between the fourth average value and the fifth average value; and
correct the color shade of the imaged image based on the stored ratio between the fourth average value and the fifth average value.

9. The image processing device according to claim 1, wherein the CPU is further configured to correct the imaged image based on a number of the first set of sample images that is one of equal to or more than a threshold value.

10. The image processing device according to claim 1, wherein
the CPU is further configured to select the first set of sample images from the plurality of obtained images by removal of each of a first obtained image of the plurality of obtained images and a second obtained image of the plurality of obtained images,
the first obtained image has an ISO value higher than a specific ISO value,
the first obtained image has an exposure value one of higher or lower than a specific exposure value, and
the second obtained image is a consecutive shot of the first obtained image.

11. The image processing device according to claim 1, further comprising an imaging device configured to capture the plurality of images, wherein
the CPU is further configured to control the memory to store each of the first average value and the second average value in association with a component of the imaging device.

12. The image processing device according to claim 11, wherein
the imaging device includes an optical lens and an imaging element,
the optical lens is configured to output light, and
the imaging element is configured to:
receive the light output from the optical lens; and
generate a pixel signal based on the light received from the optical lens.

13. The image processing device according to claim 3, wherein
each quantitative value of the first plurality of quantitative values corresponds to a power spectrum of the respective first region of the respective sample image in the first set of sample images, and
the CPU is further configured to:
calculate a third average value of a plurality of specific values, wherein
each specific value of the plurality of specific values corresponds to a power spectrum of a respective first region of a respective sample image in a second set of sample images,
the first set of sample images is imaged by a first imaging device, the second set of sample image is imaged by a second imaging device different from the first imaging device, and
a position of the first region of the first sample image corresponds to a position of the first region of a second sample image of the second set of sample images;
calculate a ratio between the first average value and the third average value;
control the memory to store the ratio between the first average value and the third average value; and
correct resolution of the first sample image and the second sample image based on the stored ratio between the first average value and the third average value.

14. The image processing device according to claim 13, wherein the CPU is further configured to control the memory to store each of the first average value in association with the first imaging device, and the third average value in association with the second imaging device.

15. An image processing method, comprising:
obtaining a plurality of images;
determining a set of sample images from the obtained plurality of images;
dividing a sample image of the set of sample images into a plurality of regions, wherein the plurality of regions includes a first region and a second region;
calculating a quantitative value of each region of the plurality of regions of the sample image;
calculating a first average value of a first plurality of quantitative values, wherein
the first plurality of quantitative values includes the quantitative value of the first region of the sample image, and
each quantitative value of the first plurality of quantitative values corresponds to a respective first region of a respective sample image in the set of sample images;
calculating a second average value of a second plurality of quantitative values, wherein
the second plurality of quantitative values includes the quantitative value of the second region of the sample image, and
each quantitative value of the second plurality of quantitative values corresponds to a respective second region of the respective sample image in the set of sample images;
calculating a ratio between the first average value and the second average value;
controlling a memory to store the ratio between the first average value and the second average value; and
correcting an imaged image based on the stored ratio between the first average value and the second average value.

16. An imaging device, comprising:
an optical lens configured to output light;
an imaging element configured to:
receive the light output from the optical lens; and
generate a pixel signal based on the light received from the optical lens; and
a central processing unit (CPU) configured to:
obtain a plurality of images based on the generated pixel signal;
determine a set of sample images from the obtained plurality of images;
divide a sample image of the set of sample images into a plurality of regions, wherein the plurality of regions includes a first region and a second region;
calculate a quantitative value of each region of the plurality of regions of the sample image;
calculate a first average value of a first plurality of quantitative values, wherein
the first plurality of quantitative values includes the quantitative value of the first region of the sample image, and
each quantitative value of the first plurality of quantitative values corresponds to a respective first region of a respective sample image in the set of sample images;
calculate a second average value of a second plurality of quantitative values, wherein
the second plurality of quantitative values includes the quantitative value of the second region of the sample image, and
each quantitative value of the second plurality of quantitative values corresponds to a respective second region of the respective sample image in the set of sample images;
calculate a ratio between the first average value and the second average value;
control a memory to store the ratio between the first average value and the second average value; and
correct an imaged image based on the stored ratio between the first average value and the second average value.

17. The imaging device according to claim 16, wherein at least one of the optical lens or the imaging element is detachable from the imaging device.

* * * * *